(12) United States Patent
Bacus et al.

(10) Patent No.: US 9,485,399 B2
(45) Date of Patent: Nov. 1, 2016

(54) BILLIARD TABLE LIGHTING AND GAME PLAY MONITOR

(71) Applicant: Smart Billiard Lighting LLC, Oak Brook, IL (US)

(72) Inventors: James W. Bacus, Oak Brook, IL (US); James V. Bacus, Harbor Springs, MI (US)

(73) Assignee: Smart Billiard Lighting LLC, Oak Brook, IL (US)

( * ) Notice: Subject to any disclaimer, the term of this patent is extended or adjusted under 35 U.S.C. 154(b) by 0 days.

(21) Appl. No.: 14/815,318

(22) Filed: Jul. 31, 2015

(65) Prior Publication Data
US 2016/0037139 A1  Feb. 4, 2016

Related U.S. Application Data

(60) Provisional application No. 62/032,187, filed on Aug. 1, 2014.

(51) Int. Cl.
*H05B 37/02* (2006.01)
*H04N 5/225* (2006.01)
(Continued)

(52) U.S. Cl.
CPC ............ *H04N 5/2256* (2013.01); *H04N 5/247* (2013.01); *H04N 5/77* (2013.01); *H04N 7/181* (2013.01);
(Continued)

(58) Field of Classification Search
CPC ...... A63D 15/00; H04N 5/2256; H04N 5/77; H04N 7/181; H05B 37/0227; H05B 37/0236
See application file for complete search history.

(56) References Cited

U.S. PATENT DOCUMENTS 4,882,676 A  11/1989  VanDeKop
5,272,607 A  12/1993  Grimm
(Continued)

FOREIGN PATENT DOCUMENTS

CN  201282530  7/2009
CN  101628174  1/2010
(Continued)

OTHER PUBLICATIONS

Tang, T., et al.; "An Auto-Scoring Billiards System"; Proceedings of the Eighth International Conference on Machine Learning and Cybernetics, Baoding, Jul. 12-15, 2009. 5 pages
(Continued)

*Primary Examiner* — Dave Czekaj
*Assistant Examiner* — MD Haque
(74) *Attorney, Agent, or Firm* — Fitch Even, Tabin & Flannery LLP

(57) ABSTRACT

A billiard table top lighting apparatus provides substantially uniform lighting across the surface of a billiard table surface. In one form, the lighting apparatus includes a frame supporting lights that are non-centrally placed such that no lights are supported above a middle portion of the billiard table surface. So configured, the frame can have an attractive profile and further mount additional items above the billiard table surface to enable a variety of other features. For example, the frame may support one or more cameras, one or more motion sensors, one or more microphones, and/or one or more computing devices to enable any of a variety of innovative features. Such features could include automatic game play recording from one or more perspectives, merged video track storage for replay, review, and analysis, automatic lighting and dimming control, control of the apparatus from any mobile device, and the like.

42 Claims, 21 Drawing Sheets

(51) Int. Cl.
*H04N 7/18* (2006.01)
*H04N 5/247* (2006.01)
*H04N 5/77* (2006.01)
*H04N 9/82* (2006.01)
*A63D 15/00* (2006.01)

(52) U.S. Cl.
CPC ........ *H04N 9/8211* (2013.01); *H05B 37/0227* (2013.01); *H05B 37/0236* (2013.01); *A63D 15/00* (2013.01)

(56) References Cited

U.S. PATENT DOCUMENTS

| | | | |
|---|---|---|---|
| 6,554,451 | B1 | 4/2003 | Keuper |
| 6,626,558 | B2 | 9/2003 | Momot |
| 7,284,870 | B2 | 10/2007 | Toyota |
| 7,648,257 | B2 | 1/2010 | Villard |
| 7,922,346 | B2 | 4/2011 | Katsuda |
| 7,936,119 | B2 | 5/2011 | Cheng |
| 7,976,187 | B2 | 7/2011 | Villard |
| 8,105,174 | B1 | 1/2012 | SchofieldSr |
| 8,210,723 | B2 | 7/2012 | Peck |
| 8,253,353 | B2 | 8/2012 | Baggen |
| 8,258,721 | B2 | 9/2012 | Meyer |
| 8,292,733 | B2 | 10/2012 | Crawford |
| 8,616,971 | B2 | 12/2013 | Lundback |
| 8,810,687 | B2 * | 8/2014 | Ishii ............... H04N 5/232 348/231.3 |
| 2003/0081410 | A1 | 5/2003 | Bailey |
| 2006/0063599 | A1 | 3/2006 | Greenspan |
| 2008/0111310 | A1 | 5/2008 | Parvanta |
| 2009/0116210 | A1 | 5/2009 | Cutler |
| 2010/0062859 | A1 | 3/2010 | Rice |
| 2010/0225236 | A1 | 9/2010 | Luberek |
| 2011/0021256 | A1 | 1/2011 | Lundback |
| 2011/0021257 | A1 | 1/2011 | Lundback |
| 2011/0070960 | A1 | 3/2011 | Greenspan |
| 2011/0255276 | A1 | 10/2011 | Coward |
| 2011/0294585 | A1 | 12/2011 | Penna |
| 2012/0033426 | A1 | 2/2012 | Wendt |
| 2012/0134155 | A1 | 5/2012 | Wendt |
| 2012/0182733 | A1 | 7/2012 | Cho |
| 2012/0188757 | A1 | 7/2012 | Villard |
| 2013/0002166 | A1 | 1/2013 | Meyer |
| 2013/0033859 | A1 | 2/2013 | Yaphe |
| 2013/0039050 | A1 | 2/2013 | Dau |
| 2013/0039061 | A1 | 2/2013 | Sato |
| 2014/0043801 | A1 | 2/2014 | Kawabata |

FOREIGN PATENT DOCUMENTS

| | | |
|---|---|---|
| CN | 101848376 | 9/2010 |
| CN | 201815088 | 5/2011 |
| CN | 102327697 | 1/2012 |
| CN | 202270324 | 6/2012 |
| CN | 103170126 | 6/2013 |
| CN | 103182177 | 7/2013 |
| CN | 103285578 | 9/2013 |
| DE | 4039315 | 6/1992 |
| EP | 0435910 | 3/1994 |
| ES | 2333839 | 3/2010 |
| FR | 2804879 | 8/2001 |
| GB | 2479902 | 11/2011 |
| JP | 2002186702 | * 7/2002 |
| JP | 2006043017 | 2/2006 |
| JP | 2009273542 | 11/2009 |
| JP | 2010046446 | 3/2010 |
| KR | 20090013980 | 2/2009 |
| KR | 20090074127 | 7/2009 |
| KR | 20100015258 | 2/2010 |
| KR | 20110075967 | 7/2011 |
| KR | 20110085735 | 7/2011 |
| KR | 20110112683 | 10/2011 |
| KR | 101145126 | 5/2012 |
| KR | 20120069233 | 6/2012 |
| KR | 20120113578 | 10/2012 |
| KR | 20130057102 | 5/2013 |
| KR | 20130087247 | 8/2013 |
| WO | 9005005 | 5/1990 |
| WO | 2009126982 | 10/2009 |

OTHER PUBLICATIONS

Uchiyama, H., et al.; "AR Supporting System for Pool Games Using a Camera-Mounted Handheld Display"; Hindawi Publishing Corporation, Advances in Human-Computer Interaction; vol. 2008, Article ID 357270; 14 pages.

Larsen, L. et al.; "The Automated Pool Trainer-a Multi Modal System for Learning the Game of Pool"; Center for PersonKommunikation; Aalborg University, Aalborg, Denmark; 2001, 6 pages.

Marr, H..; "Hacking on Side Projects: the Pool Ball Tracker"; GoCardLess Blog; web page https://gocardless.com/blog/hacking-on-side-projects-the-pool-ball-tracker/; Oct. 29, 2012; 5 pages.

Screenshots from video available at www.youtube.com, illustrating table with LED lights in the table's perimeter; 2011.

Printout from board: RPI for Billiards Trajectory Tracking Blog 2013, 4 pages.

Shih, C., et al.; "A Vision Based Billiard Ball Tracking Platform, Motion Analysis Strategy and Their Integration for a Reliable Billiard Training System"; Journal of Information Science and Engineering; 22 pages, available as early as Dec. 2013.

Saito, H.; "Vision-Based 3D Tracking for Entertainment Systems via Visual Media"; Keio University; UARC Core1-3 Project Summary Booklet; 4 pages, available as early as Dec. 2013.

Local classifieds, Canada; Kijiji; website http://www.kijiji.ca/v-toys-games/calgary/incredible-led-pool-table-lights/564191018?enableSearchNavigationFlag=true; 1 page, first accessed May 2014.

Internet Forum; http://forums.azbilliards.com/showthread.php?t=257876; 2011; 8 pages.

J. Baekdahl et al.; "Detection and Identification of Pool Balls Using Computer Vision"; Vision, Graphics and Interactive Systems; Aalborg University; May 28, 2011; 63 pages.

Notification of Transmittal of the International Search Report for PCT/US2015/043198 mailed Oct. 29, 2015; 6 pages.

Written Opinion of the International Searching Authority for PCT/US2015/043198 mailed Oct. 29, 2015.

* cited by examiner

BILLIARD TABLE LIGHTING AND GAME PLAY MONITOR

RELATED APPLICATION(S)

This application claims the benefit of U.S. provisional patent application No. 62/032,187, filed Aug. 1, 2014, the contents of which are incorporated by reference as though fully re-written herein.

TECHNICAL FIELD

This invention relates generally to billiard table lighting and more particularly to providing substantially uniform billiard table lighting to facilitate automated game play monitoring including image capture and automated image and video merging and other associated features.

BACKGROUND

The game of billiards and related table top games have been known for many years. Such games involve movement of balls on a table top. Typically a ball is struck with an instrument such as a cue to move the ball around the table top surface for positioning, to strike and move other balls, and the like. In some variants, balls are struck into holes in or at edges of the table top called pockets. In other variants, balls are struck so as to contact in a particular way other balls on the table top and/or cushions that line the table top to keep the balls on the table top surface. These games have a variety of names including cue sports, billiards, pool, snooker, pocket billiards, among others. For clarity and convenience, such games will be referred to collectively as billiards or billiard.

Generally speaking, the most popular form of billiards involves a number of colored balls placed on a table. Over many years the sport has attracted significant public interest as a spectator event and also as a personal pastime or hobby, similar to golf and tennis. Because of its colorful nature there has been increased interest in applying modern video capture technology and computing and imaging technology to record or analyze game play. There are available sophisticated methods of video recording of game play, such as in tournaments or exhibits using booms or strategically placed cameras, where a director manually dictates which camera feed to use during play, and where a remote voice commentary is fed into the video record. There are also many examples of "do-it yourself" video recording from manually placed cameras, where the field of view covers the entire table and player activities from a distance and at a perspective view. There have additionally been attempts to place cameras directly over the table, using image analysis to locate the balls and perform ball tracking, but ignoring the view areas around the table and player's activities that are the prominent features of the simple recording of game play with video cameras.

Such attempts at video recording and image ball recognition systems, however, fail to be applicable to a wider general audience of billiard game players. A significant failure of prior attempts is the lack of an integrated approach to incorporate the lighting of the table, both forms of video recording and an audio record of ball sounds and player voices into one approach, at a low cost, and with the ease of use related to one single integrated apparatus.

For instance, to capture sufficiently high quality images of the balls to allow advanced game play by computerized image analysis, the billiard table surface should be substantially uniformly lighted. To achieve rapid, ball recognition by image analysis the scene segmentation portion of the image analysis procedure is most efficiently accomplished by having a flat uniformly lit background. Billiard tables, however, are typically lit using one or more light sources disposed above a center portion of the table such that lighting at the edges of the table is markedly worse than at the center. Although the World Pool-Billiard Association provides the following equipment specifications for lighting, such specifications do not suggest the level of uniform illumination typically needed for imaging projects: "15. Lights The bed and rails of the table must receive at least 520 lux (48 footcandles) of light at every point. A screen or reflector configuration is advised so that the center of the table does not receive noticeably more lighting than the rails and the corners of the table. If the light fixture above the table may be moved aside (referee), the minimum height of the fixture should be no lower than 40 inches (1.016 m) above the bed of the table. If the light fixture above the table is non-movable, the fixture should be no lower than 65 inches (1.65 m) above the bed of the table. The intensity of any directed light on the players at the table should not be blinding. Blinding light starts at 5000 lux (465 footcandles) direct view. The rest of the venue (bleachers, etc.) should receive at least 50 lux (5 footcandles) of light." Under such specifications, uniform illumination sufficient for imaging analysis is not readily available. As a result, automatic image analysis of balls at table edges can result in inaccurate ball identification or insufficiently accurate ball location determinations. As a result, rapid automatic image analysis of ball movement and location cannot be accomplished efficiently and cost effectively with conventional billiard table lighting.

Additionally, there is a need to have one video recording of game play that can simultaneously allow for accurate ball movement and position, such as may be accomplished by image analysis in the plane of the table surface but at the same time, in the same video record provide the video views of player activity around the near periphery of the table.

SUMMARY

Generally speaking, pursuant to these various embodiments, a billiard table top lighting apparatus is described that provides substantially uniform lighting of a billiard table surface, but also optionally includes as an integrated component with multiple devices for recording and viewing game play embedded in the light structure itself. In one form, the lighting apparatus includes a frame supporting lights that are non-centrally placed such that no lights are supported above a middle portion of the billiard table surface. Other lighting configurations are possible.

So configured, the frame can have an attractive profile and further include additional items above the billiard table surface to enable a variety of other features. For example, the frame may support one or more cameras, one or more motion sensors, one or more microphones, and/or one or more computing devices to enable any of a variety of innovative features. Such features could include automatic game play recording from one or more perspectives by multiple cameras, automatically reconstructed, merged video track storage from the multiple camera views for replay, review, and analysis, automatic lighting and dimming control, control of the apparatus from any mobile device, and the like. These and other benefits may become clearer upon making a thorough review and study of the following detailed description.

BRIEF DESCRIPTION OF THE DRAWINGS

The above needs are at least partially met through provision of the billiard table lighting and game play monitor described in the following detailed description, particularly when studied in conjunction with the drawings, wherein.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Figure 1:
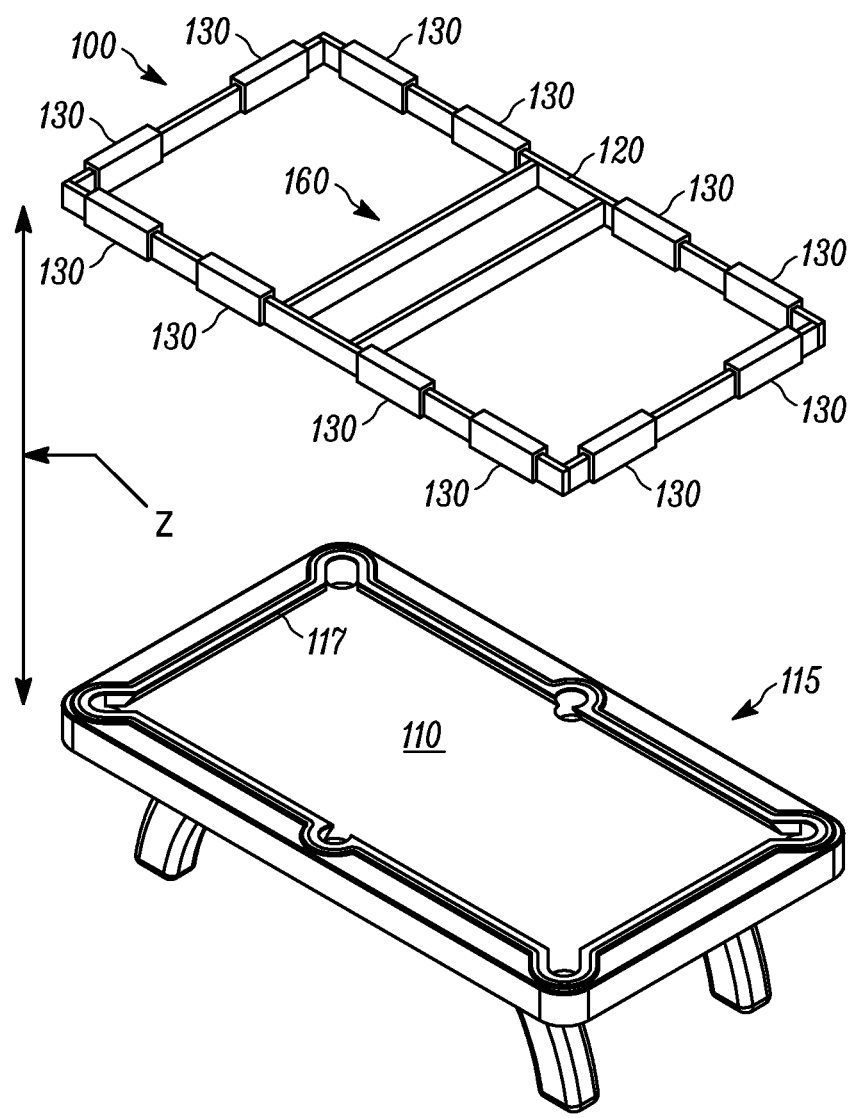
FIG. 1 comprises a perspective view of an example lighting apparatus disposed above a billiard table as configured in accordance with various embodiments of the invention.

Referring now to the drawings, and in particular to FIG. 1, an illustrative lighting apparatus 100 for lighting a billiard table surface 110 and that is compatible with many of these teachings will now be presented. The billiard table surface 110 is supported by a table 115 and is bounded by cushions 117 that define the edges of the billiard table surface. The lighting apparatus 100 includes a frame 120 configured to support one or more lights 130 at a spaced distance Z above the billiard table surface 110. To enable certain of the game play image capture and analysis features, the one or more lights 130 include a light source or sources mounted in the frame 120 in a configuration to provide substantially uniform illumination of the billiard table surface 110. Although the examples discussed in this disclosure relate to various peripheral lighting approaches, it is contemplated that any lighting arrangement for providing uniform illumination can be applied, such as using in any combination strategically placed lights, lensing, reflectors, shades, diffusers, and the like.

Figure 2:
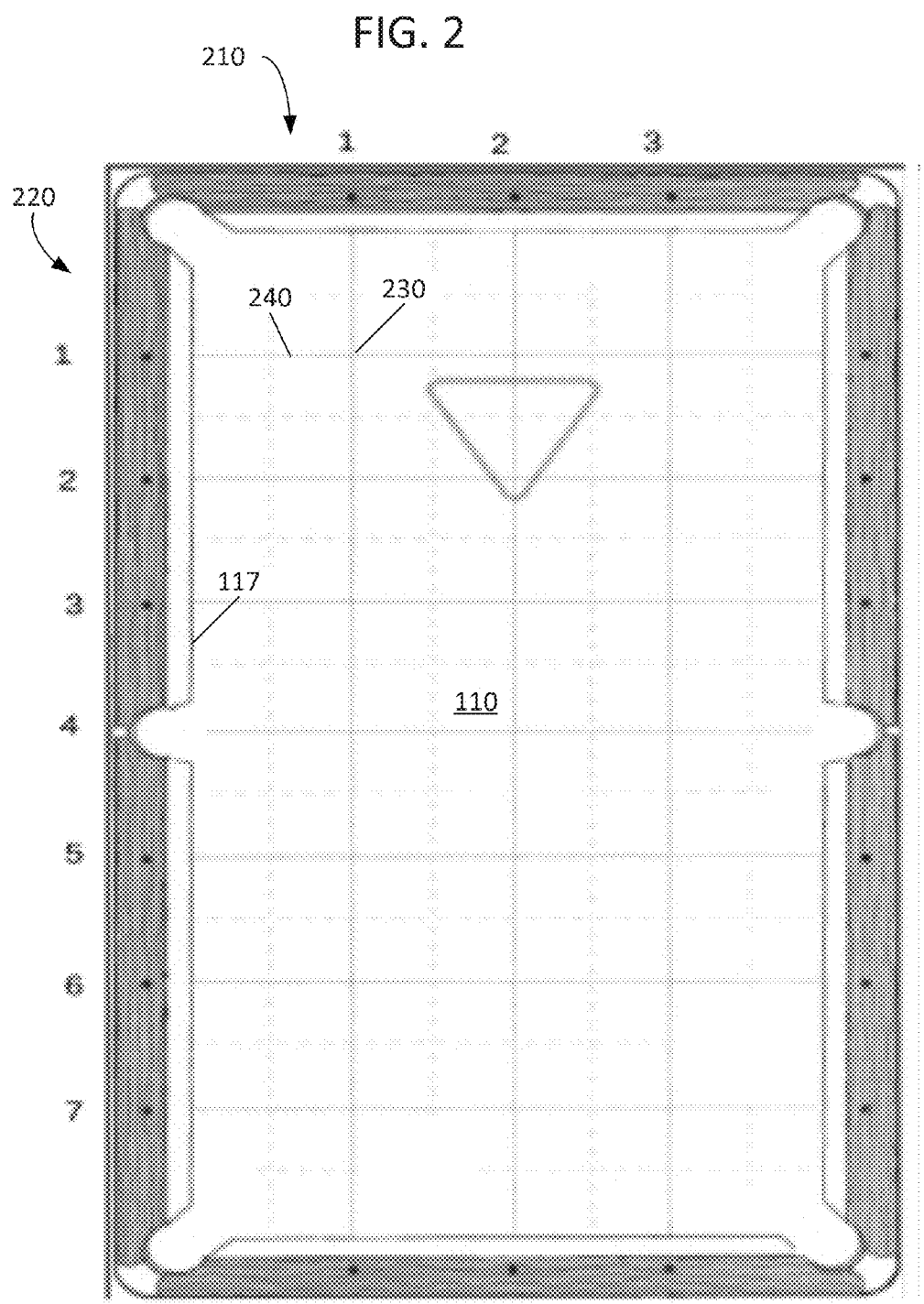
FIG. 2 comprises a top view of a billiard table to illustrate use of table markers to determine illumination measurement sites.

The concept of uniform illumination will be discussed further with respect to FIGS. 2-6. Different sets of illumination measurements were taken to confirm the uniform illumination of the disclosed lighting approach. FIG. 2 illustrates how the table markers labeled 1, 2, and 3 at the foot end 210 and 1 through 7 at the table side 220 were used to establish measurement points 230 on the table surface where projections 240 from the table markers intersected. An Extech foot-candle/lux light meter was placed at each of the measurement points on a standard billiard table illuminated by a typical overhead, centered billiard table light manufactured by Diamond Billiards with no other ambient light sources on. The illumination measurements at the measurement points illustrated in FIG. 2 are listed in both foot-candles and lux in Table 1 below. Table 1 further notes the average illumination (AVG), the coefficient of variation of the measurements (CV) (which is a normalized measure of dispersion of a probability distribution or frequency distribution and is defined as the ratio of the standard deviation to the mean or average), and the standard deviation of the measurements (STD).

TABLE 1

Diamond Billiards Light (in footcandles)

|   | 1 | 2 | 3 |   |
|---|---|---|---|---|
| 1 | 81 | 88 | 84 | STD = 17 |
| 2 | 105 | 109 | 109 |   |
| 3 | 119 | 125 | 119 | AVG = 108 |
| 4 | 125 | 131 | 125 |   |
| 5 | 121 | 127 | 122 | CV = 15% |
| 6 | 107 | 113 | 106 |   |
| 7 | 85 | 89 | 86 |   |

Diamond Billiards Light (in lux)

|   | 1 | 2 | 3 |   |
|---|---|---|---|---|
| 1 | 870 | 945 | 908 | STD = 178 |
| 2 | 1130 | 1176 | 1170 |   |
| 3 | 1280 | 1340 | 1281 | AVG = 1165 |
| 4 | 1345 | 1408 | 1340 |   |
| 5 | 1305 | 1366 | 1310 | CV = 15% |
| 6 | 1147 | 1212 | 1142 |   |
| 7 | 910 | 958 | 924 |   |

Table 2 lists illumination measurements taken at the same measurement points of a billiard table using a light configured in accord with the approaches of FIGS. 1 and 7-12 with no other ambient light sources on.

TABLE 2

Smart Billiards Light (in footcandles)

|   | 1 | 2 | 3 |   |
|---|---|---|---|---|
| 1 | 48 | 50 | 49 | STD = 1.4 |
| 2 | 50 | 52 | 51 |   |
| 3 | 51 | 52 | 51 | AVG = 51 |
| 4 | 51 | 52 | 50 |   |
| 5 | 52 | 52 | 51 | CV = 3% |
| 6 | 51 | 52 | 50 |   |
| 7 | 49 | 50 | 48 |   |

TABLE 2-continued

Smart Billiards Light (in lux)

|   | 1 | 2 | 3 |   |
|---|---|---|---|---|
| 1 | 515 | 539 | 526 | STD = 15.0 |
| 2 | 541 | 560 | 544 |   |
| 3 | 550 | 563 | 549 | AVG = 544 |
| 4 | 551 | 560 | 543 |   |
| 5 | 555 | 563 | 544 | CV = 3% |
| 6 | 553 | 562 | 540 |   |
| 7 | 524 | 537 | 512 |   |

Figure 3:
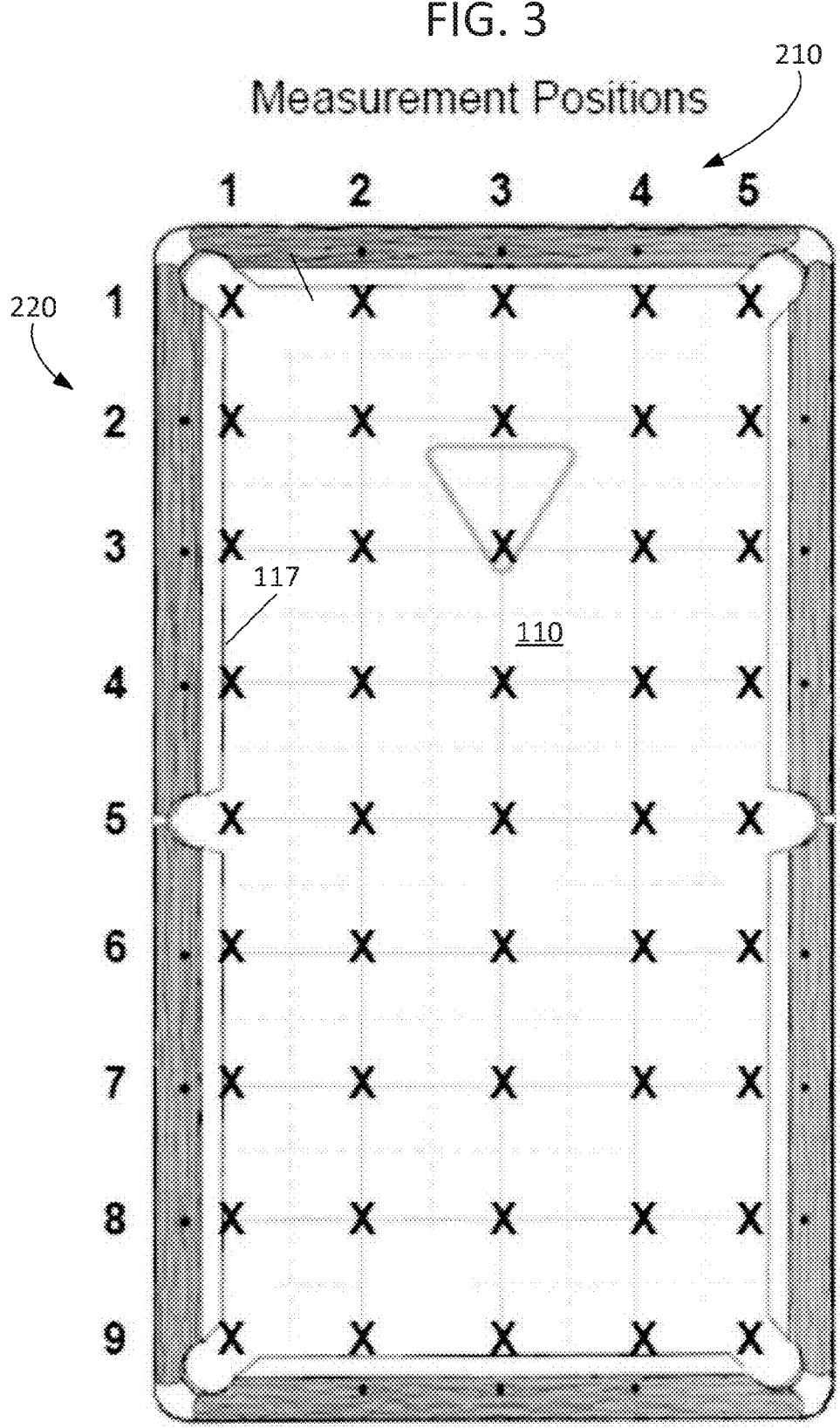
FIG. 3 comprises a top view of a billiard table to illustrate another use of table markers to determine illumination measurement sites.
Figure 4:
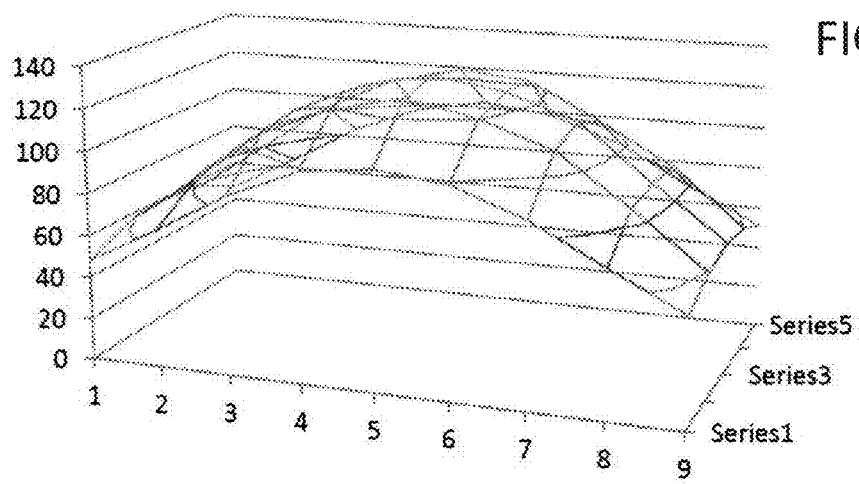
FIG. 4 comprises a three-dimensional graph of illumination measurements on a billiard table lit using a prior art lighting apparatus.

FIG. 3 illustrates a similar approach to establishing illumination measurement points X except to expand the points X to include the intersection of the marker projections with the cushions 117 to determine the lighting uniformity for more of the billiard table surface 110. The illumination for the table having the standard Diamond Billiards light was re-measured using these measurement points with results shown in Table 3 below and in FIG. 4. Also, measurements were made on a number of other pool tables with other commonly used center table lights in two commercial pool establishments in the Chicago area with similar measurement results to those illustrated in Table 3 below.

TABLE 3

Diamond Billiards Light (Stevensville Jul. 15, 2014)

|   | 1 | 2 | 3 | 4 | 5 |   |
|---|---|---|---|---|---|---|
| 1 | 48 | 57 | 59 | 57 | 47 | STD = 25.1 |
| 2 | 66 | 80 | 86 | 80 | 65 |   |
| 3 | 85 | 106 | 109 | 103 | 84 | AVG = 90 |
| 4 | 99 | 120 | 124 | 119 | 97 |   |
| 5 | 103 | 127 | 131 | 127 | 103 | CV = 28% |
| 6 | 99 | 120 | 125 | 123 | 99 |   |
| 7 | 87 | 109 | 113 | 106 | 87 |   |
| 8 | 69 | 85 | 88 | 87 | 68 |   |
| 9 | 52 | 60 | 63 | 60 | 51 |   |

The billiard table lighted with the prototype light for which first measurements are listed above also had its illumination re-measured but with a dimmer set to adjust the average lighting output to closer to the commercially available Diamond Billiard light using the measurement points of FIG. 3. The results are listed in Table 4 below and are illustrated in FIG. 5.

TABLE 4

|   | 1 | 2 | 3 | 4 | 5 |   |
|---|---|---|---|---|---|---|
| 1 | 93 | 99 | 101 | 98 | 90 | STD = 6.8 |
| 2 | 100 | 108 | 109 | 106 | 97 |   |
| 3 | 103 | 110 | 111 | 108 | 100 | AVG = 102 |
| 4 | 102 | 109 | 110 | 108 | 100 |   |
| 5 | 103 | 109 | 109 | 107 | 100 | CV = 7% |
| 6 | 102 | 109 | 110 | 107 | 99 |   |
| 7 | 102 | 109 | 110 | 107 | 98 |   |
| 8 | 97 | 105 | 106 | 103 | 93 |   |
| 9 | 88 | 93 | 95 | 91 | 84 |   |

Figure 5:
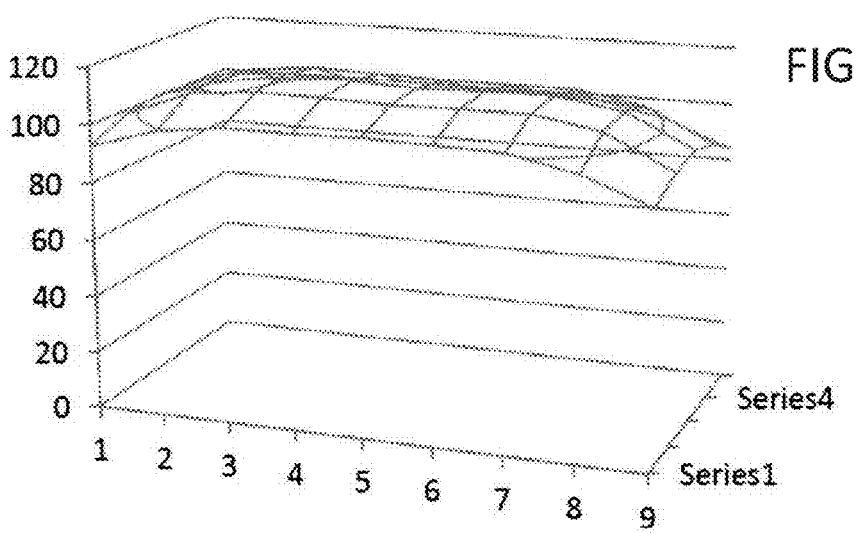
FIG. 5 comprises a three-dimensional graph of illumination measurements on a billiard table lit using a lighting apparatus as configured in accordance with various embodiments of the invention.
Figure 6:
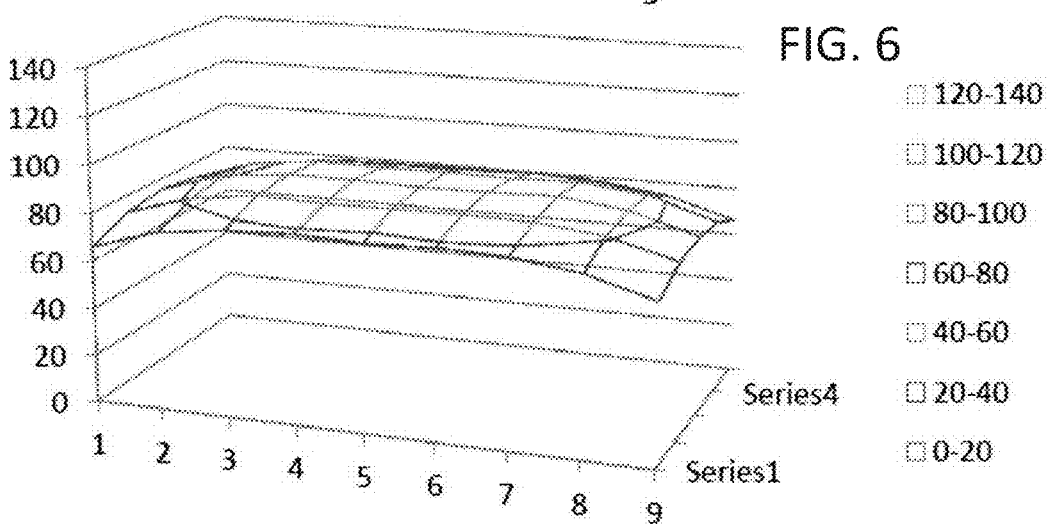
FIG. 6 comprises a three-dimensional graph of a simulation of illumination measurements on a billiard table lit using a lighting apparatus as configured in accordance with various embodiments of the invention.

To further illustrate this approach, a commercial lighting, ray tracing, simulation program (Photopia software from LTI Optics) was used to generate simulated illumination levels for a billiard table lit according to that of Table 4 and FIG. 5. The simulation results listed below in Table 5 and illustrated in FIG. 6 are largely consistent with the physical illumination measurements separately taken.

TABLE 5

SBL Simulation Pool_08 (Prototype 1, Jul. 19, 2014)

|   | 1  | 2  | 3  | 4  | 5  |           |
|---|----|----|----|----|----|-----------|
| 1 | 66 | 73 | 75 | 73 | 66 | STD = 5.9 |
| 2 | 75 | 81 | 84 | 82 | 75 |           |
| 3 | 78 | 85 | 86 | 85 | 78 | AVG = 79  |
| 4 | 79 | 84 | 86 | 85 | 79 |           |
| 5 | 78 | 84 | 86 | 85 | 79 | CV = 7%   |
| 6 | 79 | 84 | 86 | 85 | 80 |           |
| 7 | 78 | 84 | 87 | 85 | 78 |           |
| 8 | 74 | 81 | 83 | 82 | 74 |           |
| 9 | 67 | 73 | 75 | 73 | 66 |           |

Thus, the arrangements described herein demonstrate substantially uniform illumination of the billiard table surface of between about 50 and 115 foot-candles. In short, instead of a variance of 15% when using only mid-table readings or 28% when including illumination at the cushions, the disclosed lighting apparatus has a coefficient of variation of only 3% using the mid-table readings and only 7% when using illumination at the cushions. In short, the cushion to cushion overall illumination uniformity for the disclosed lighting apparatus was better than the mid-table illumination uniformity for a standard billiard table light. Accordingly, substantially uniform illumination for the table will include an illumination coefficient of variation of about 14% or less, more preferably 10% or less, from cushion to cushion measured at the locations described above as shown in FIG. 3.

Figure 7:
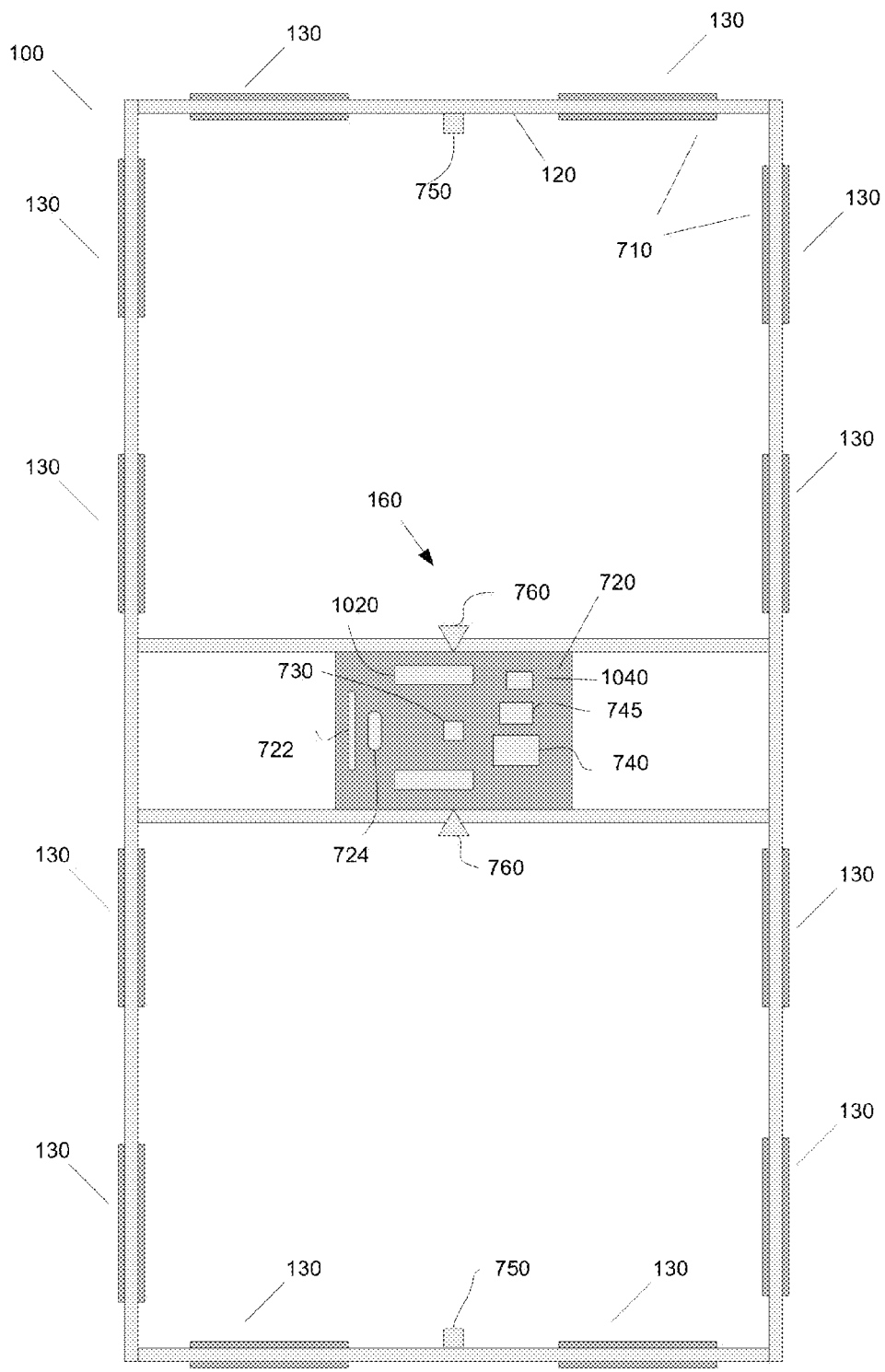
FIG. 7 comprises a top view of an example lighting apparatus as configured in accordance with various embodiments of the invention.
Figure 8:
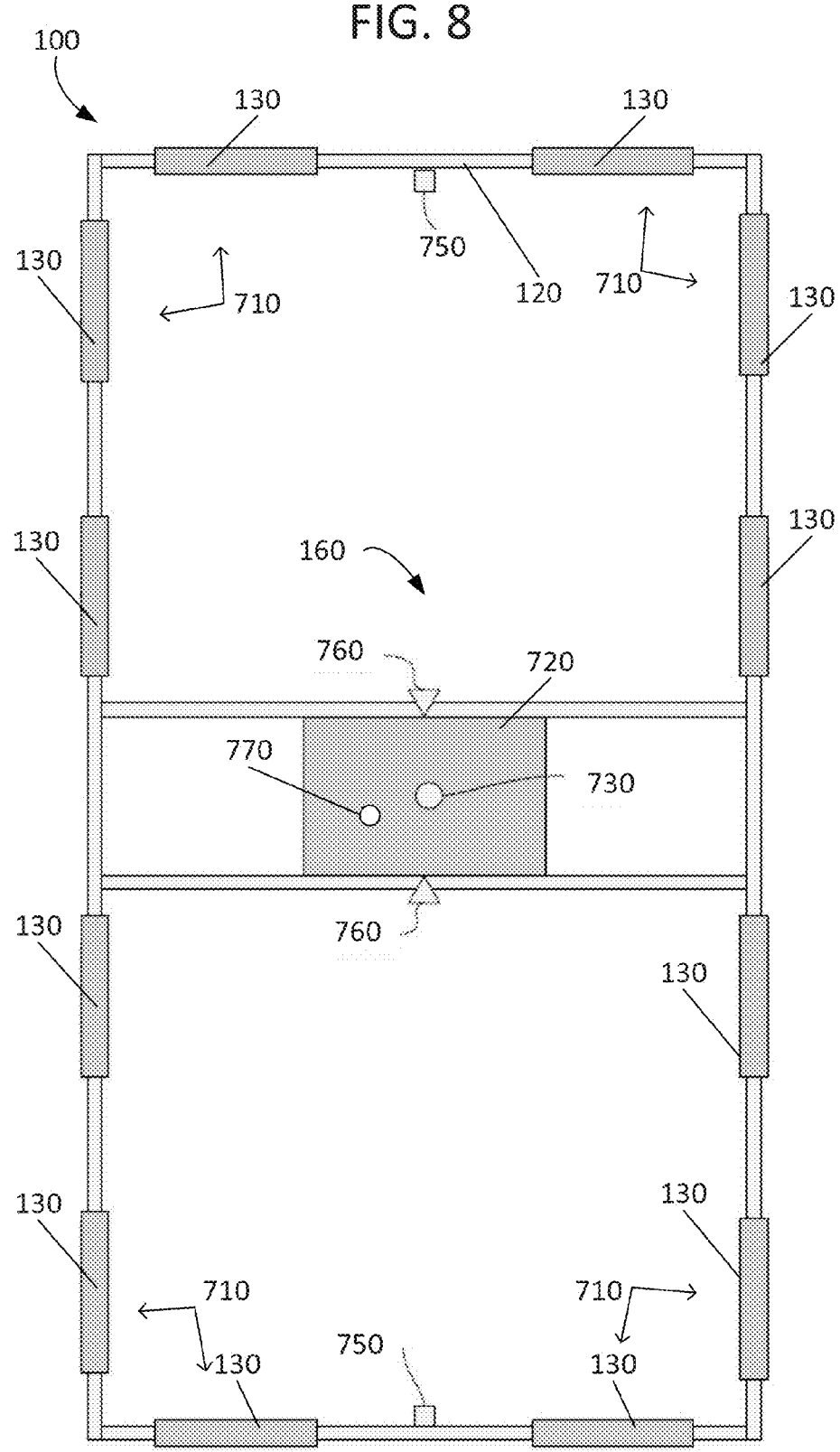
FIG. 8 comprises a bottom view of the example lighting apparatus of FIG. 7 as configured in accordance with various embodiments of the invention.

Turning back to the example lighting approach measured above, and with reference to FIGS. 7-8, a frame 120 is mounted above the billiard table surface with one or more light sources 130 mounted in the frame 120. The light source or sources may include light sources 130 mounted in the frame 120 in a configuration around a periphery of the billiard table surface 110. The periphery will typically correspond to an area projected above the cushions or edges of the billiard table surface 110. For example, the frame 120 can be configured to mount the one or more lights 130 within a given horizontal distance from edges of the billiard table 110 such as within ten inches of the vertical projection of the cushion's 117 edge, and more preferably within five inches. In one approach, the one or more lights are non-centrally placed such that no light sources are placed approximately directly above a middle portion of the billiard table surface 110. The middle portion of the billiard table surface 110 will be generally understood to correspond to the area of the surface 110 between projections of the foot end 210 markers 2 and 4 of FIG. 3 from about marker 2 to about marker 8 of the side table 220 markers of FIG. 3.

In one approach, the frame 120 is configured to mount pairs 710 of the one or more lights 130 in a generally perpendicular configuration above each corner of the billiard table surface 110. In a further aspect, the frame 120 is configured to mount two of the one or more lights 130 generally equally spaced along each long side of billiard table surface 110 as illustrated in FIG. 1. The frame 120 may further include a middle frame portion 720 spanning across a middle portion 160 of the frame 120 corresponding to a middle portion of the billiard table surface 110 when mounted above the billiard table surface 110.

Figure 9:
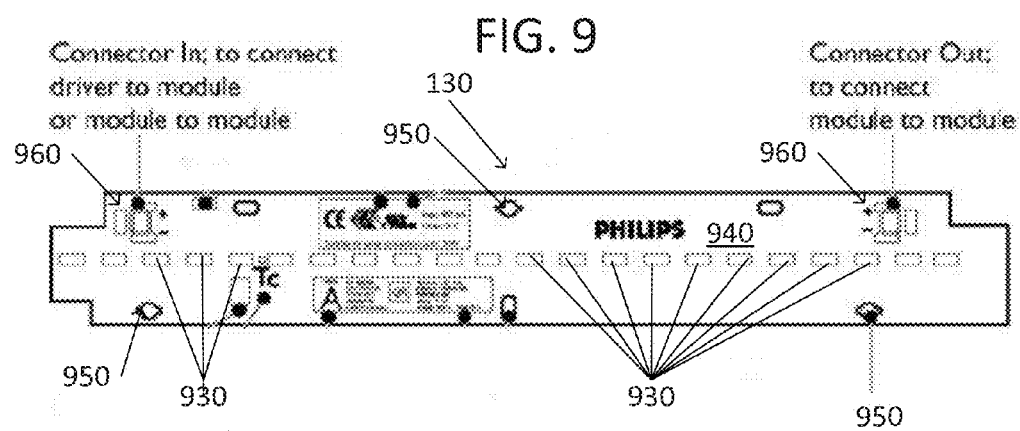
FIG. 9 comprises a plan view of a light source as used in accordance with various embodiments of the invention.

The light sources 130 can comprise any suitable light source. In the illustrated examples, the light sources 130 each include a set of light emitting diode (LED) lights 930 mounted in a linear configuration such as illustrated in FIG. 9. In this example, the light source 130 is an off the shelf light bar manufactured by PHILIPS having a mounting surface 940 on which the LED lights 930 are mounted, here in a linear configuration only, although additional LED lights could be mounted in addition to those set in a linear configuration. Mounting holes 950 in the mounting surface 940 facilitate mounting of the light source 130 to the frame 120. Electrical connectors 960 allow for wired connections to a power source or driver or to another light source 130 such that one power source or driver can power and drive more than one light source 130.

Figure 10:
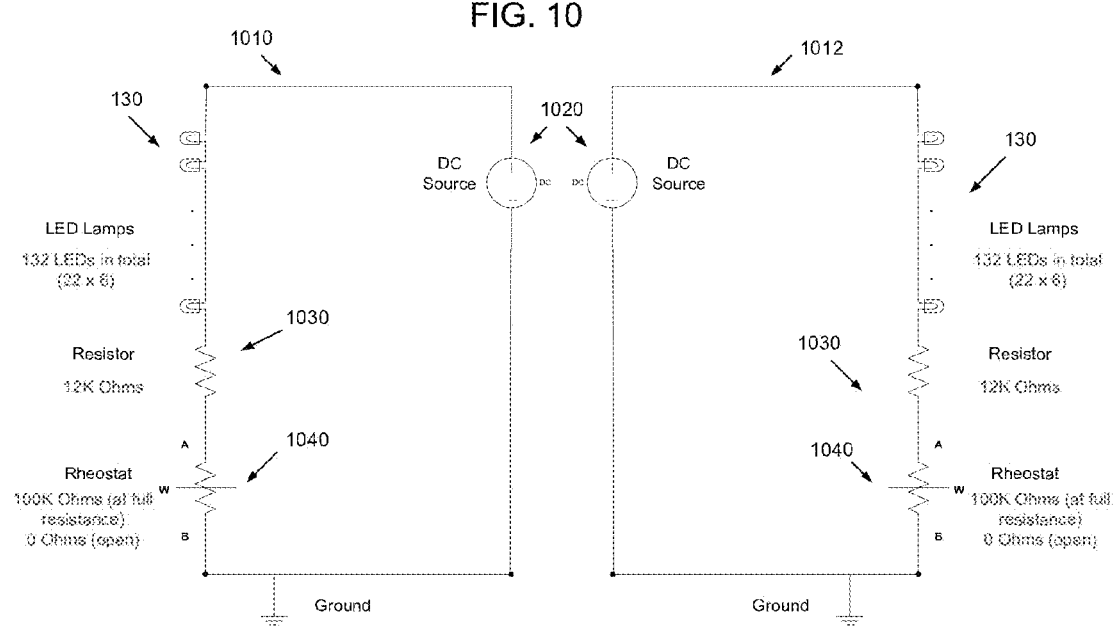
FIG. 10 comprises a circuit diagram for the light sources of an example lighting apparatus as configured in accordance with various embodiments of the invention.
Figure 11:
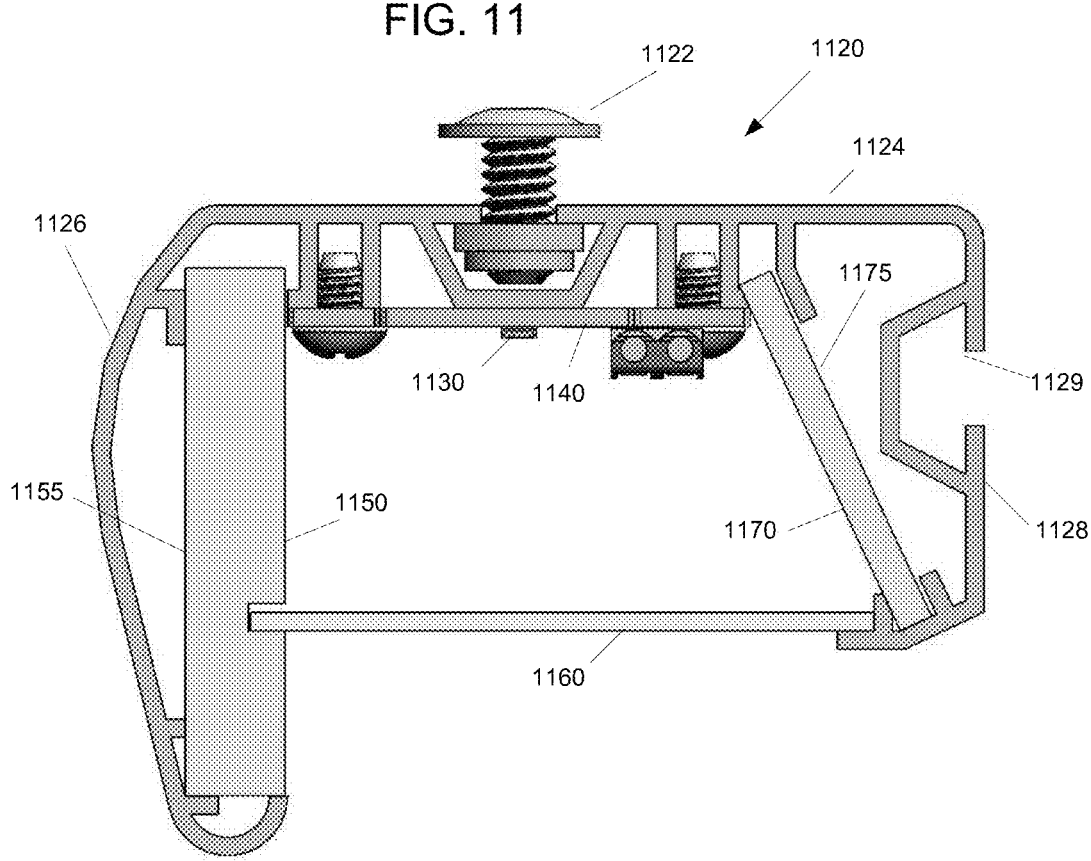
FIG. 11 comprises a cross-section view of one example of a frame for an example lighting apparatus mounted above a billiard table in accordance with various embodiments of the invention.

FIG. 10 illustrates an example driver or power circuit for powering the light sources 130 of the lighting apparatus, in this example, a PHILIPS XITANIUM 75W 0.7-2.0 A 0-10V dimming device. Here, the light sources 130 are divided into two groups with each group having its own otherwise identical circuit 1010 and 1012. Each circuit in turn includes a power source 1020, resistor 1030, and rheostat 1040 connected in series with the light sources 130. The rheostat 1040 controls the amount of current flowing through the LED light sources 130 thereby controlling the brightness of the lights as a group. Alternatively, and as is well known in the art, a pulse width modulation (PWM) circuit may be used to modulate the light intensity.

Generally speaking, the frame 120 further supports shades, reflectors, or the like to direct light from the light sources 130 to the billiard table surface and protect the players' eyes from direct exposure to the LEDs. Alternatively or in addition, one or more reflectors and/or a diffuser element can be added to diffuse the light from the LEDs and provide a more uniform aesthetic. In the example design of the frame's 1120 internal portion illustrated in FIG. 11, the frame 1120 is in the shape of a troffer, i.e., a narrow inverted trough, serving as a light source support, reflector, and holder of diffusers. The troffer frame 1120 is substantially hollow in its inner structure, which is configured to support one or more lights by a top portion or upper support construction 1124 of the inner structure opposing a portion of the troffer frame closest to the billiard table surface when installed. Opposing sides of the troffer frame 1120 extend down from the top portion encasing the lights and support reflective surfaces. The illustrated example is constructed from extruded aluminum and has continuous t-slots along the length of the top surface and inside surface to provide attachment points for supports to mount the frame to room ceilings, and for the attachment of video cameras 750, or other devices. The t-slots accommodate a t-slot nut and screw/bolt 1122 which slides along the t-slot track to aid various attachments. The frame's upper support construction 1124 supports the lighting elements (here an LED circuit board 1140 supporting LEDs 1130) to face in the direction of the table surface. In this example, the LEDs 1130 are supported to face essentially straight down, in other words, such that the plane in which the LEDs 1130 are supports is essentially horizontal with the table surface although other arrangements are possible. Light from the LED's 1130, however, emits in a variety of directions and can be distractingly bright in one's field of view.

To spread the light and allow a player to play without distraction from the LEDs 1130, the frame 1120 supports one or more diffusers. In the illustrated example of FIG. 11, a particular diffuser arrangement is illustrated that redirects light rays from the LED 1130 that would otherwise be absorbed by the frame or be directed in a manner to not hit the table, so as to adequately light the billiard table surface and still diffuse light from the LEDs 1130, and so as to not be distracting to a player. In this example, a first mirrored diffuser 1150 is disposed between the light source or sources (such as LED 1130) and an outer wall 1126 of the frame 1120 that faces away from the center of the billiard table surface. The back surface 1155 is mirrored and the rest of the thicker portion of the diffuser 1150 is constructed from a substance that diffuses the reflected light, both before and after reflection by the mirrored surface 1155. The width of the diffuser 1150 is oriented essentially perpendicular with the billiard table surface so that the mirrored surface 1155 of the diffuser 1150 reflects light toward the center of the billiard table to help provide adequate lighting of the table surface. In one approach, this diffuser 1150 is a commercially available diffuser (Evonik Platinum Ice OM001 X1) and is 0.34 inch thick. For the aluminum extrusion of the design illustrated in FIG. 11, the mirrored diffusor is 1.8 inches from top to bottom in the cross section of FIG. 11 and, for a standard size 9 foot pocket billiard table, is 95.8 inches along the sides of the frame and is 45.8 inches along the ends of the frame. Other lengths are possible.

A bottom diffuser 1160 is supported to be disposed between the light source or sources (such as LED 1130) and the billiard table surface. In this example, the bottom diffuser 1160 is a commercially available diffuser (Evonik Satin Ice OD002 DF) that is 0.08 inch thick and 2.125 inches wide. This diffuser 1160 diffuses the LED's 1130 light so that game players will not be distracted by the strong light that can emanate from individual LEDs. Instead, the observed light is diffused to provide a more uniform appearing light. This diffusing also spreads the light is a more uniform manner across the table surface. In addition, the bottom diffuser 1160 protects the LEDs 1130 from being struck by a cue.

A second mirrored diffuser 1170 is disposed between the light source or sources (such as LED 1130) and an inner wall 1128 of the frame 1120 that faces toward the center of the billiard table surface. The inner wall 1128 may define a t-slot channel 1129 which optionally supports additional elements such as one or more cameras, motion sensors, or the lighting apparatus's middle section 160. In this example, the second mirrored diffuser 1160 is a commercially available diffuser (Evonik Platinum Ice OM001 X1) that is 0.118 inch thick, 1.3 inches wide, and, for a standard size 9 foot pocket billiard table, is 95.8 inches along the sides of the frame and is 45.8 inches along the ends of the frame. Other lengths are possible. The second mirrored diffuser 1170 is disposed at an angle so that its mirrored surface 1175 reflects light generally toward both the bottom diffuser 1160 and the first mirrored diffuser 1150 to effect direction of more light at the billiard table surface through the bottom diffuser 1160 and via additional reflection off of the first mirrored diffuser 1140. The diffusers 1150, 1160, and 1170 extend at least the length of the frame 1120 corresponding to a length of the frame along which the LED's 130 are supported although the diffusers 1150, 1160, and 1170 can extend any length along the frame. Typically, for example, the bottom diffuser 1160 will extend around the entire frame 1120 to provide a more uniform aesthetic for the frame 1120.

Figure 12:
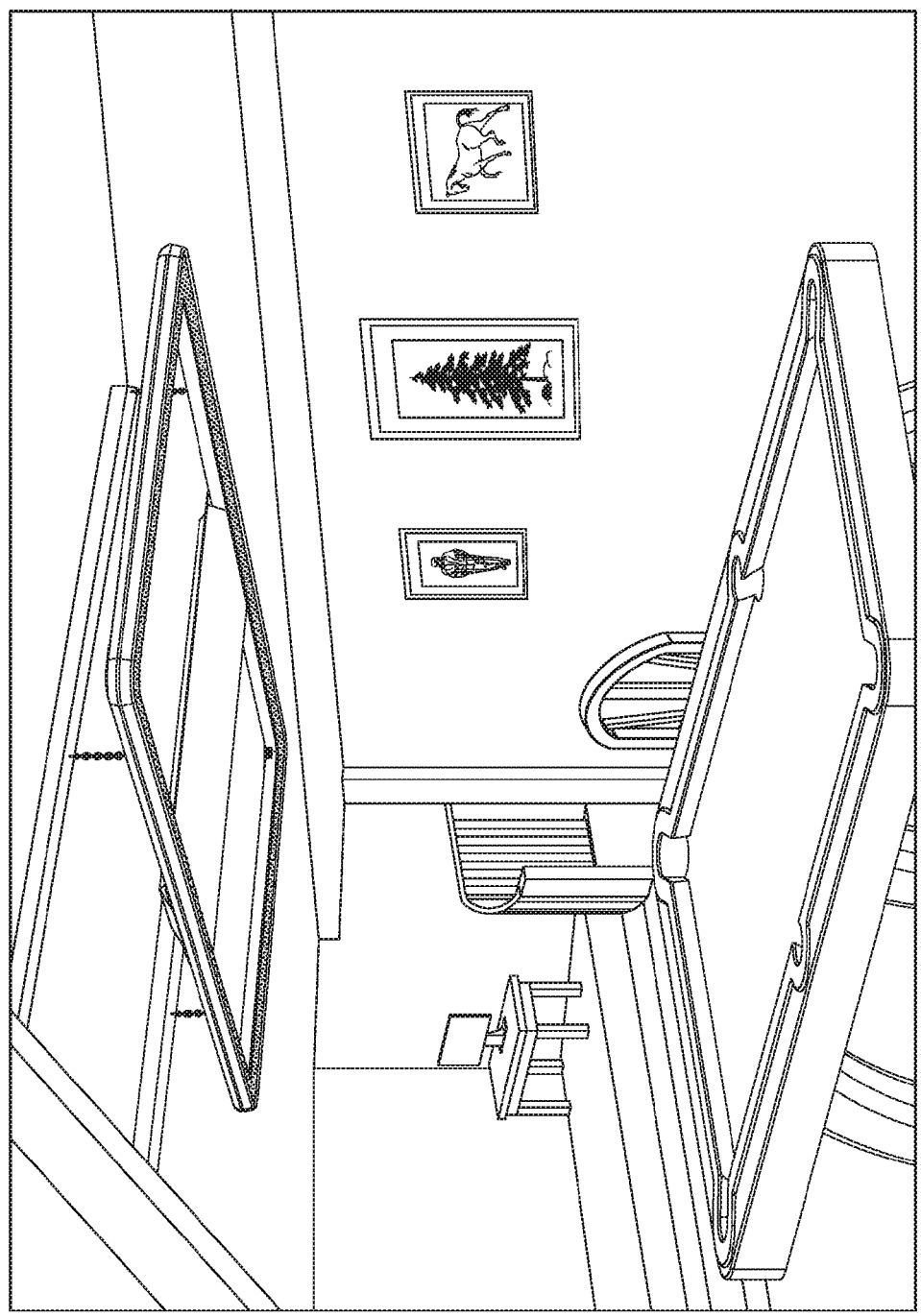
FIG. 12 comprises a head end perspective view picture of an example lighting apparatus mounted above a billiard table in accordance with various embodiments of the invention.

An example implementation of the frame 1120 as installed above a billiard table is illustrated in FIG. 12, where the combined internal frame mirror and diffuser configuration smooth's out the light from the LEDs creating an aesthetic, even illumination on the table surface.

Referring again to FIGS. 7 and 8, the middle frame portion 720 may be configured to support a variety of other elements to add a variety of features to the lighting apparatus. For example, all or some of the electrical and/or computing elements needed to provide a variety of function can be mounted on the middle frame portion 720 top side to be not visible to the players. In one application, an A/C power strip 722 is mounted to the middle frame portion 720 to provide outlet power to various elements. An A/C switch 724 provides a master power switch for the lighting apparatus 100.

In one aspect, the middle portion 720 of the frame 120 supports a middle camera 730 directed to record images of the billiard table surface 110. The camera 730 may be mounted so that the image sensor is in a plane essentially parallel to the table surface and high enough above the table such that the camera lens projects the entire table surface area onto its image sensor. If necessary, depending on the camera lens and image sensor size, and to keep the distance Z in FIG. 1 within a preferred height, the light path from the table to the camera may be deflected with a 45 degree mirror or similar optical arrangement, so that the image sensor is perpendicular to the table surface. In effect the light path distance is made adjustable within the middle portion of the frame 720, horizontally, so as not to alter the preferred height of the frame above the table, but to still obtain a mapping of the complete table surface area onto the image sensor. In either configuration, one frame of video from middle camera 730 maps the entire table surface onto the image sensor for rapid and efficient image processing purposes. The image processing of the table surface single frames is made even more efficient by the controlled uniform illumination provided by the lighting apparatus.

Figure 13A:
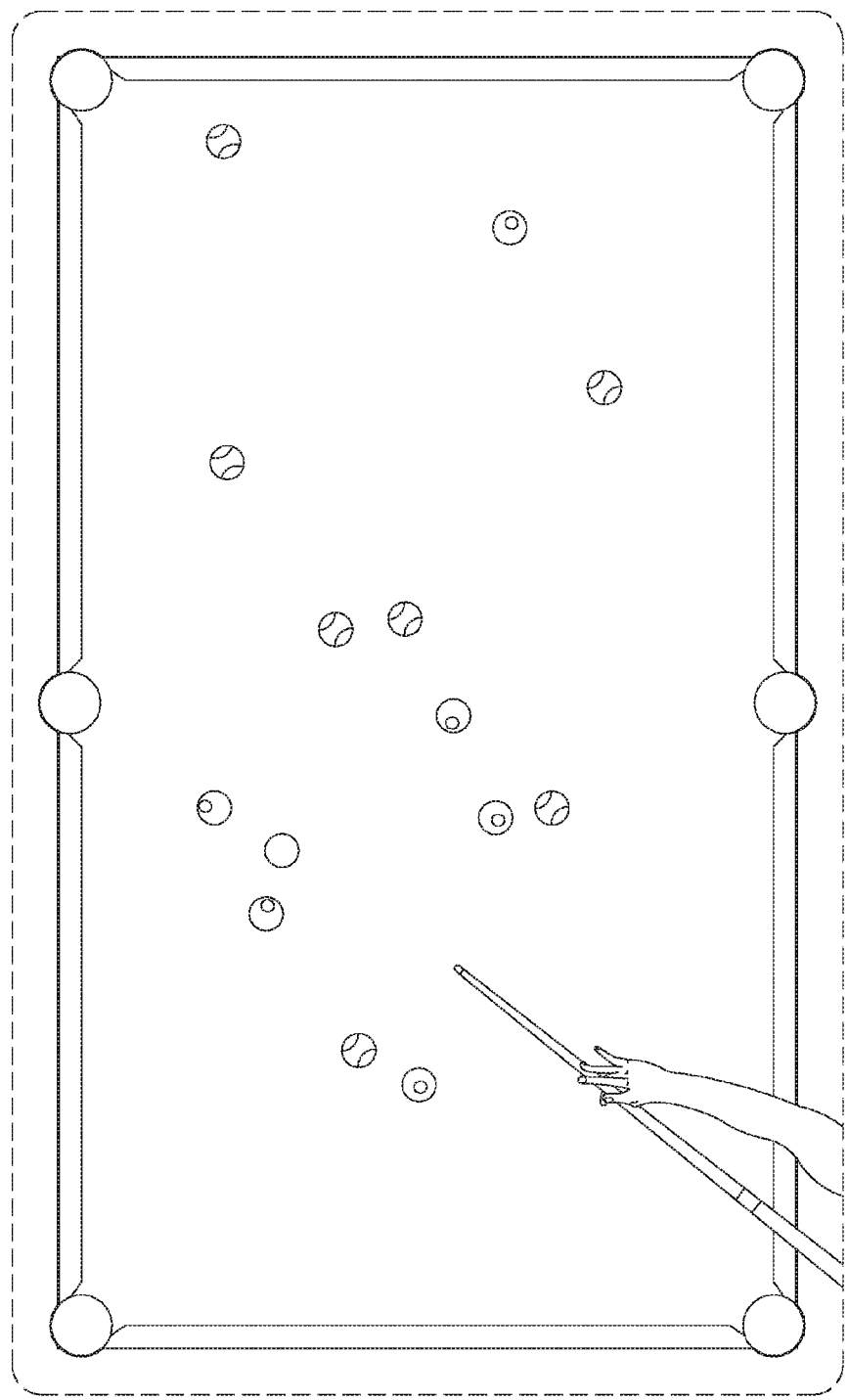
FIG. 13A comprises an example image captured from a camera mounted above a middle portion of the billiard table surface in accordance with various embodiments of the invention.
Figure 13B:
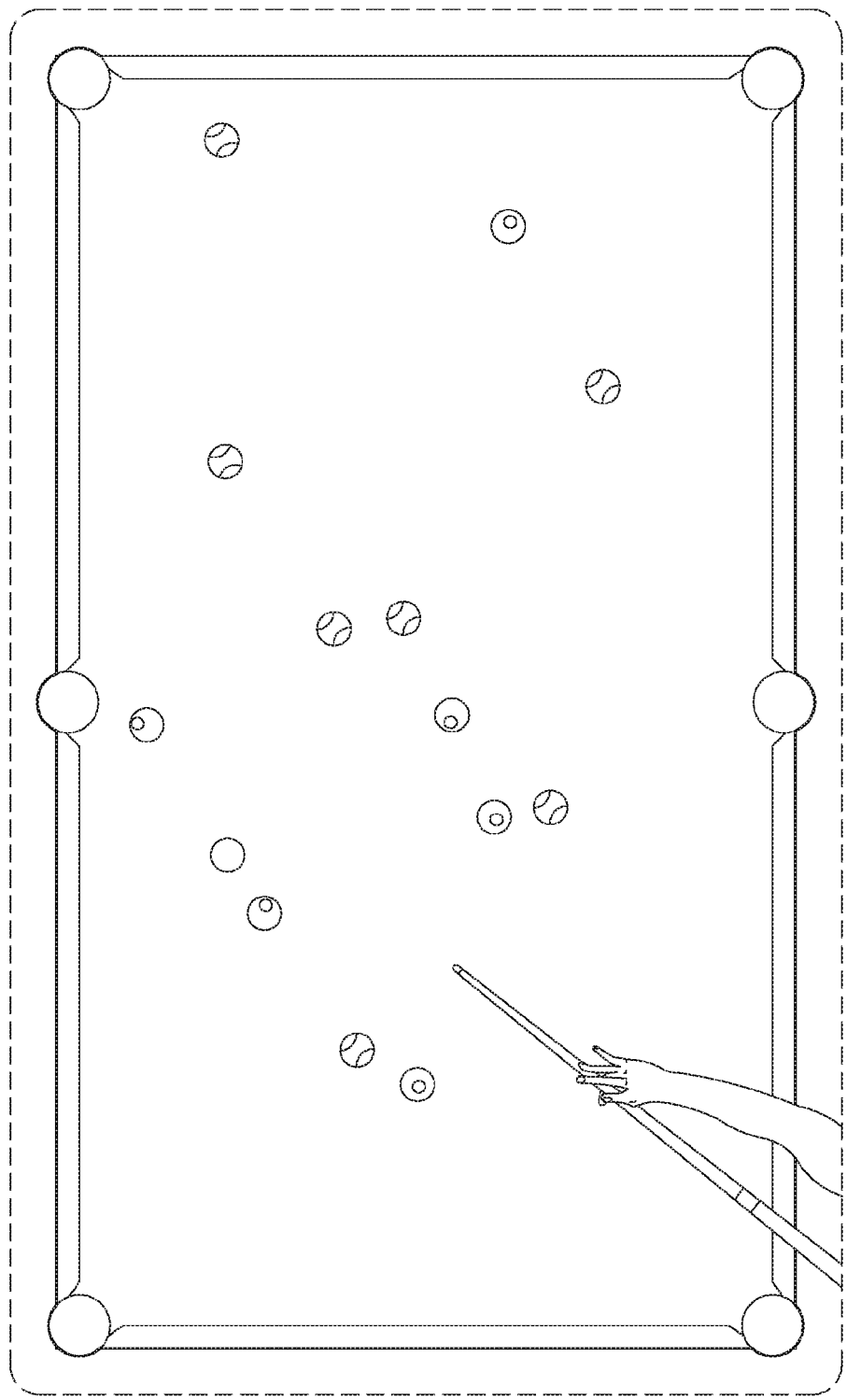
FIG. 13B comprises an example image capture in sequence, after the image from FIG. 13A, from a camera mounted above a middle portion of the billiard table surface in accordance with various embodiments of the invention.

FIGS. 13A-B show example images captured by the middle camera 730. The lighting apparatus as further described herein may include a processing device 745 in operative communication to receive the images recorded by the middle camera 730. Those skilled in the art will recognize and appreciate that such a processor device can comprise a fixed-purpose hard-wired platform or can comprise a partially or wholly programmable platform. All of these architectural options are well known and understood in the art and require no further description here. So configured, the processing device 745, and as further described herein, can also be configured to determine whether balls on the billiard table surface 110 are in motion or non-motion based on the images recorded by the middle camera 730, such as by using image by image comparison techniques or by using object identification of billiard balls on a frame by frame comparison basis to track the ball motion between frames. Then, the processing device 745 can automatically control a setting for the lighting apparatus 100 based at least in part on the balls being either in motion or non-motion. For example, in response to determining non-motion of balls on the billiard table surface, the processing device 745 effects stopping recording or provision of images from the middle camera 730. Thus, the processing device 745 and middle camera 730 can work together to operate efficiently because there is no reason to continue to transmit or record images of the billiard table surface 110 when image does not change, i.e., in between shots by the players. In one approach, the processing device 745 effects provision of images from the middle camera 730 and from the end cameras 750 to reconstruct a real time or recorded video record from the combination of cameras as described herein.

Similarly, in one example, the processing device 745 is configured to detect particular images in the field of view of the middle camera 730, in response to which, the processing device 745 can effect starting, stopping, or pausing recording or provision of images. For example, a card having a particular image could be placed on the billiard table surface so as to be in the middle camera's 730 field of view or a particular hand gesture may be made over the table surface.

Depending on which particular image is detected, the processing device 745 may react in particular corresponding ways. For example, in response to detecting one particular image (such as a large red dot on a card or other unique indicator), the processing device 745 can automatically stop execution of the program relating to the monitored game. In this way, players can readily "pause" the program in the middle of game play because the processing device 740 can automatically restart the program in response to detecting removal of the particular image. Similarly, the processing device 745 may automatically start recording of a "new" game in response to detecting a particular image associated with that action such as a large green dot on a card.

Figure 14:
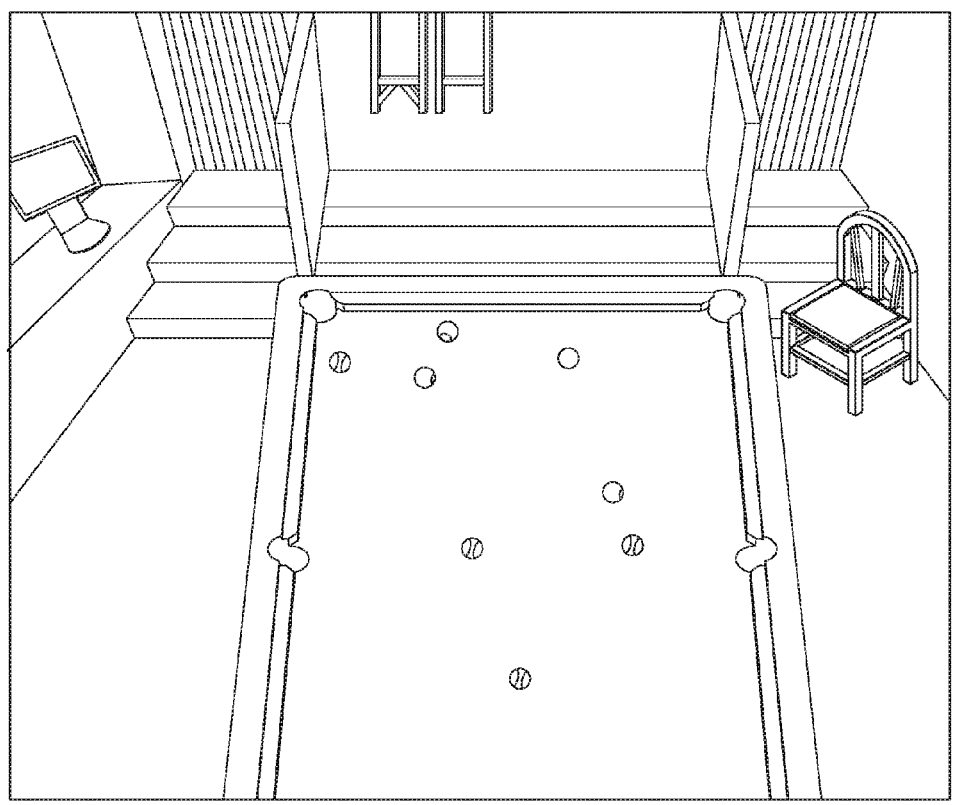
FIG. 14 comprises an example image captured from a camera mounted above the foot end portion of the billiard table surface in accordance with various embodiments of the invention.

In an additional aspect, an end portion of the frame 120 corresponding to a head or foot end portion of the billiard table surface 110 when mounted above the billiard table surface 110 can support an end camera 750 directed to record images of at least a portion of the billiard table surface 110 and an area surrounding a head or foot end portion of the billiard table surface 110 opposite that over which the end camera 750 is mounted. FIG. 14 shows an example of an image captured by an end camera 750. As illustrated in FIGS. 7 and 8, the frame 120 can support end cameras 750 at both the head and foot ends to capture images of both ends of the table. The end cameras 750 provide video images of player movement around the table and the player's approach to a shot. Such images can be useful for real time viewing, recording or transmission. As further described herein the images can also be used to construct composite video frames together with the table view image frames obtained simultaneously by the middle camera 730.

Motion sensors 760 can be used to facilitate operation of the lighting apparatus. In this respect, the processing device 740 can be in operative communication with the motion sensor 760 to automatically control a setting for the lighting apparatus in response to detection of motion. In one example, the processing device 740 may be configured to power off the plurality of lights 130 automatically in response to the motion sensor's 760 failing to detect motion for a threshold set time period by electronically communicating with an A/C switch circuit 724. Similarly, the processing device 740 may be configured to increase the lighting level by communicating with a pulse width modulation circuit 1040, going from dimmed to a brightness sufficient to enable image capture and recording as described herein. In another example, the processing device 740 may be configured to provide images from a first camera in response to detecting motion from a first motion sensor and to provide images from a second camera in response to detecting motion from a second motion sensor. For instance, video or images will be recorded or transmitted from a camera oriented to capture images from an area from which motion is detected to ensure that the player movement is automatically recorded or transmitted.

In still another aspect, the processing device 745 may be configured to monitor sound captured by a microphone 770 to detect a strike sound having characteristics of a cue striking a billiard ball, and in response to detecting the strike sound, to automatically control a setting for the lighting apparatus 100. The microphone 770 may be mounted to the frame 120 or be a part of another device (such as one of the video cameras) that is in communication with the processing device 745. Furthermore, the processing device can be configured to, in response to detecting the strike sound, start recording or provision of images from the middle camera 730 mounted on the middle frame portion 720 of the frame 120 to automatically capture images of the moving balls.

Figure 15:
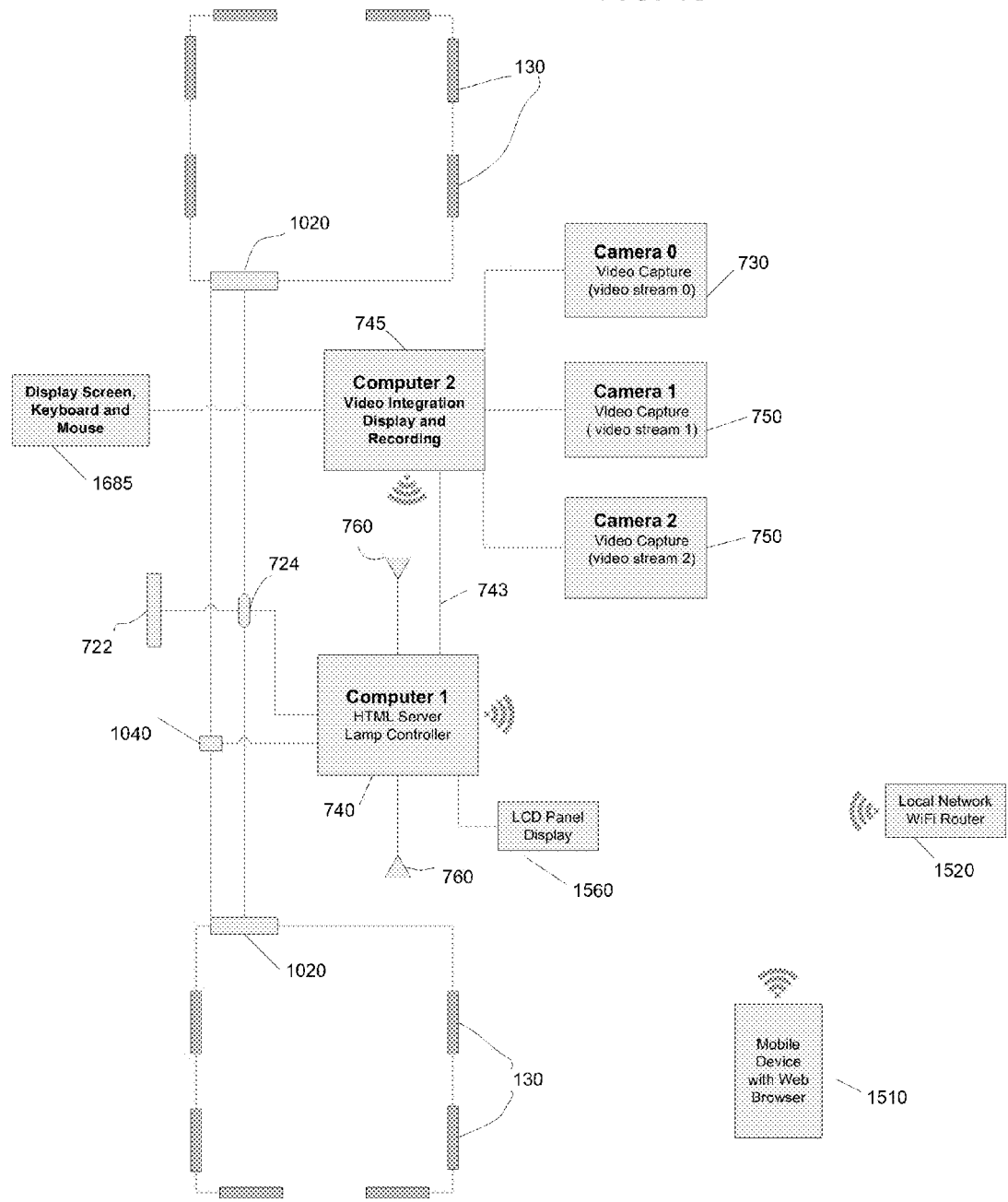
FIG. 15 comprises a block diagram of an example lighting apparatus in communication with other devices in accordance with various embodiments of the invention.
Figure 16:
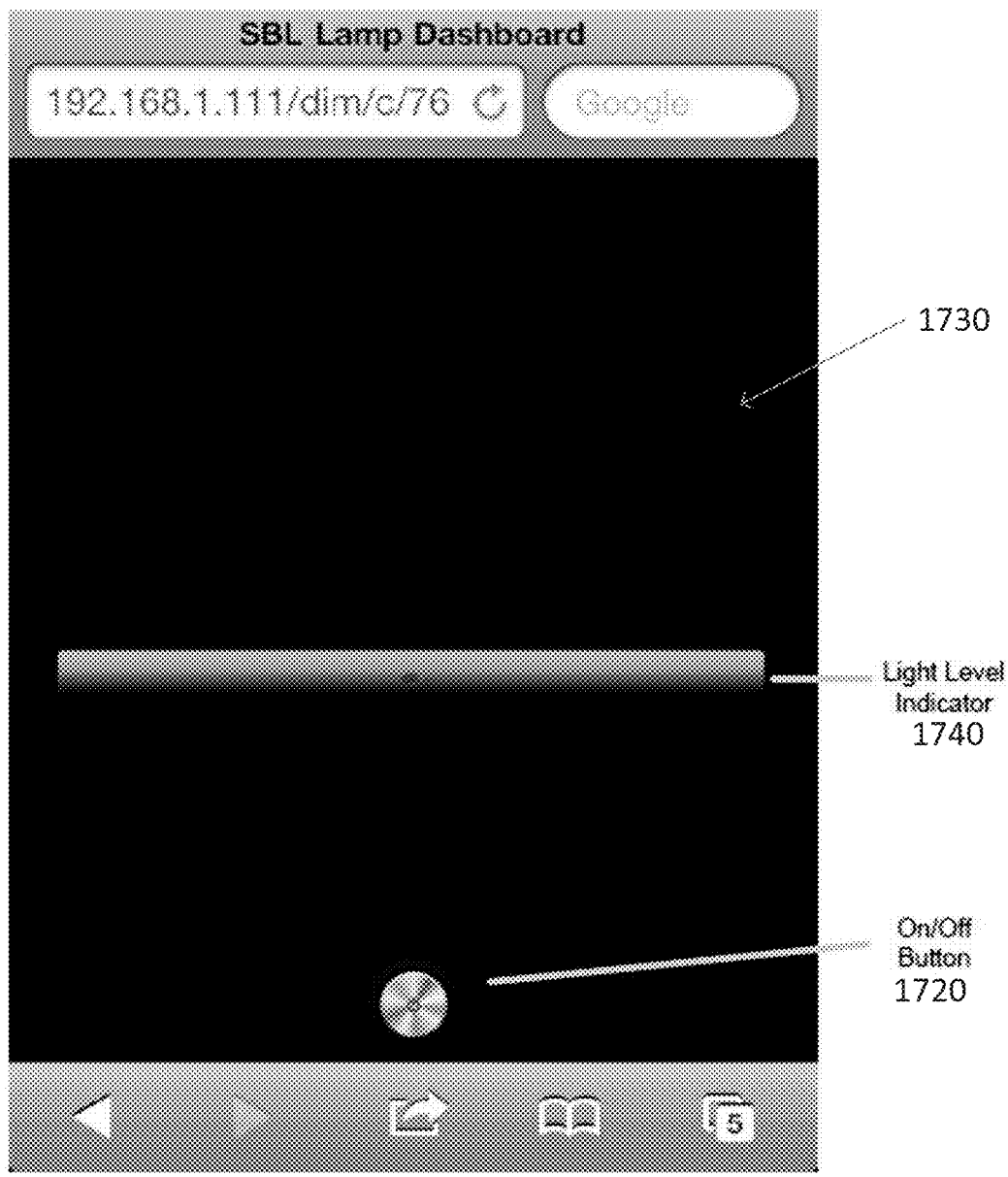
FIG. 16 comprises an example web page operator interface used to turn the lighting apparatus on or off and to control the light level in accordance with various embodiments of the invention.

The above elements can be combined in a variety of ways to provide many combinations of automated and/or remotely controlled features. One such feature is the ability to completely control the lighting apparatus and record images from the cameras 730 and 750 from mobile devices wirelessly communicating with the lighting apparatus 100. Generally speaking, a processing device is configured to communicate with a user communication device, here the mobile device 1510 although other devices could be used, to provide images from the one or more cameras 730 and 750 disposed to capture images of the billiard table surface 110 and/or areas surrounding the billiard table surface 110. In other approaches, the processing device may communicate directly with the user communication device. The processing device may then communicate with at least two cameras of the one or more cameras 730 and 750 to coordinate storage of the images or provision of the images to the user communication device 1510. One such example arrangement is illustrated in FIG. 15, utilizing first and second processing devices 740 and 745 (Computer 1 and Computer 2 respectively in FIG. 15) where the first processing device 740 is operating the lighting apparatus to turn on, adjust the brightness, and start game play, and where the second processing device 745 is dedicated to communications with the cameras 730 and 750 to facilitate selection of the cameras from which individual video streams will be stored and/or provided to a user communication device 1510. The second processing device 745 is in operative communication with the first processing device 740 via the wired connection 742 (such as an Ethernet or similar method) to receive commands with respect to starting and stopping the viewing or recording of images. Here, a generally available router device 1520 can coordinate wireless communication such as through WiFi between the mobile device 1510 and the processing device 740 of the lighting apparatus 100. In this example, the processing device 745 operates a server that hosts a web page operated from the mobile device 1510. One example of the web page is shown in FIG. 16. The server is assigned a local IP address by the router 1520, and the IP address is displayed in the LCD panel 1560. The mobile device 1510 interacts through the web page to control the light and allows the user to turn the light on or off by clicking the button 1720. The web page interface also allows the user to adjust the light level by clicking on one of a series of bars 1730 in the interface. Clicking higher on the screen provides a higher light level that is indicated by the bar 1740 moving up. The web page of FIG. 16 allows control of the lamp on/off and intensity through a background program running on the processing device 1641 interfaced via the web page to either switch power on or off through the A/C switch 724 from the processing device 1641 to the lamp circuit, or in the case of adjusting the intensity, by controlling a pulse width modulation circuit interface to the lamp power supplies 1020.

Additionally, the background program monitors the motion detectors 760 and adjusts the light intensity according to whether there is motion in the field of view of the motion detectors. As long as motion is present the lamp stays at the level set by the user. If there is no motion for a preset period, then the lamp automatically dims to a lower level using the pulse width modulation control. If there continues to be no motion for an additional preset period, the lamp turns off through the power on/off switch.

In another example of the various uses of the components of the FIG. 15, the second processor 745 is operated by the display screen, keyboard, and mouse 1685 to run a software program to display in real time (e.g., 30 frames per second) an automatically generated composite video that combines the output from all three video cameras 730 and 750. The composite video may optionally be recorded for later retrieval and review. The video is a recording, reproducing, or displaying of visual images made digitally of a scene captured sequentially in time, such that they can be viewed as moving visual images, even if there is no apparent motion for certain periods. By one approach, the method of creating a video of billiard game play recorded simultaneously from multiple video cameras includes operating at least three independent image capture threads individually associated with separate cameras asynchronously in a same time interval. The independent image capture threads use shared memory resources and event done flags to communicate with each other. The independent image capture threads asynchronously capture individual image frames from the separate cameras. mage analysis of the captured individual image frames from the separate cameras to compare the individual image frames from a given camera of the separate cameras to determine which of the individual image frames are recording motion in the respective sequence of recordings from the respective ones of the separate cameras. Certain frames are chosen, displayed, and saved in a single video memory based on which of the separate cameras is recording motion. The method includes recording at specific time intervals, such as 30 frames per second, the chosen frames into a video file of the billiard game play. The chosen frames recorded into the video file comprise whatever is present at that instant in the single video memory.

Referring again to the example of FIG. 15, in one example implementation, the video streams from the three cameras 730 and 750 are connected through USB ports to the second processing device 745 (labeled Computer 2 in FIG. 15). The video streams from the three video cameras are connected through USB ports to the processing device 745, also labeled Computer 2. In this example, the processing device 745 has an Intel quad-core CPU with hyper-threading, i.e., eight separate logical CPUs. The operating system for Computer 2 is an Ubuntu system. The eight logical CPUs can run simultaneously and asynchronously in a multi-threaded, multi-processor environment, such that a separate software thread can be running in each of the eight logical CPUs simultaneously. In the example shown in FIG. 15 and further detailed in FIGS. 18A, 18B and 18C, and Table 6 below, each video stream is input to a separate software module running on its own thread, sharing the memory allocations listed in Table 6.

TABLE 6

Shared Memory Allocations

| | |
|---|---|
| CFB0 | Current Frame Buffer-Camera 0 |
| PFB0 | Previous Frame Buffer-Camera 0 |
| DIF0 | Result of difference comparison calculation between CFB0 and PFB0 |
| CFLG0 | Frame Capture Flag 0 |
| PFLG0 | ProcessorThread 0 Done Flag |
| CFB1 | Current Frame Buffer-Camera 1 |
| PFB1 | Previous Frame Buffer-Camera 1 |
| DIF1 | Difference Comparison Calculation 1 |
| CFLG1 | Frame Capture Flag 1 |
| PFLG1 | ProcessorThread 1 Done Flag |
| CFB2 | Current Frame Buffer-Camera 2 |
| PFB2 | Previous Frame Buffer-Camera 2 |
| DIF2 | Difference Comparison Calculation 2 |
| CFLG2 | Frame Capture Flag 2 |

TABLE 6-continued

| | |
|---|---|
| PFLG2 | ProcessorThread 2 Done Flag |
| THRS | Comparison threshold, to determine motion in Camera 0 view |
| AVGDIF | Running average motion difference calculation for video stream 0 |
| DFB | Display Frame Memory Buffer |
| PIP | PIP Image Memory Buffer |
| DFLG | DirectorThread Done Flag |
| CTIME | Current time (in milliseconds) from system clock |
| PTIME | Prior time, i.e. the time that the last video frame was put in DFM |
| RFLG | Record Flag |
| DONE | Process Done Flag, initialized to NO and set to YES when Process is exited |

Hardware Device Allocations

| | |
|---|---|
| CAM0 | Camera 0 hardware image buffer-generated image available to computer |
| CAM1 | Camera 1 hardware image buffer-generated image available to computer |
| CAM2 | Camera 2 hardware image buffer-generated image available to computer |

File Storage Allocations

| | |
|---|---|
| AVI | .avi file storage on system disk or other storage media |
| WAV | .wav file storage on system disk or other storage media |

Figure 18A:
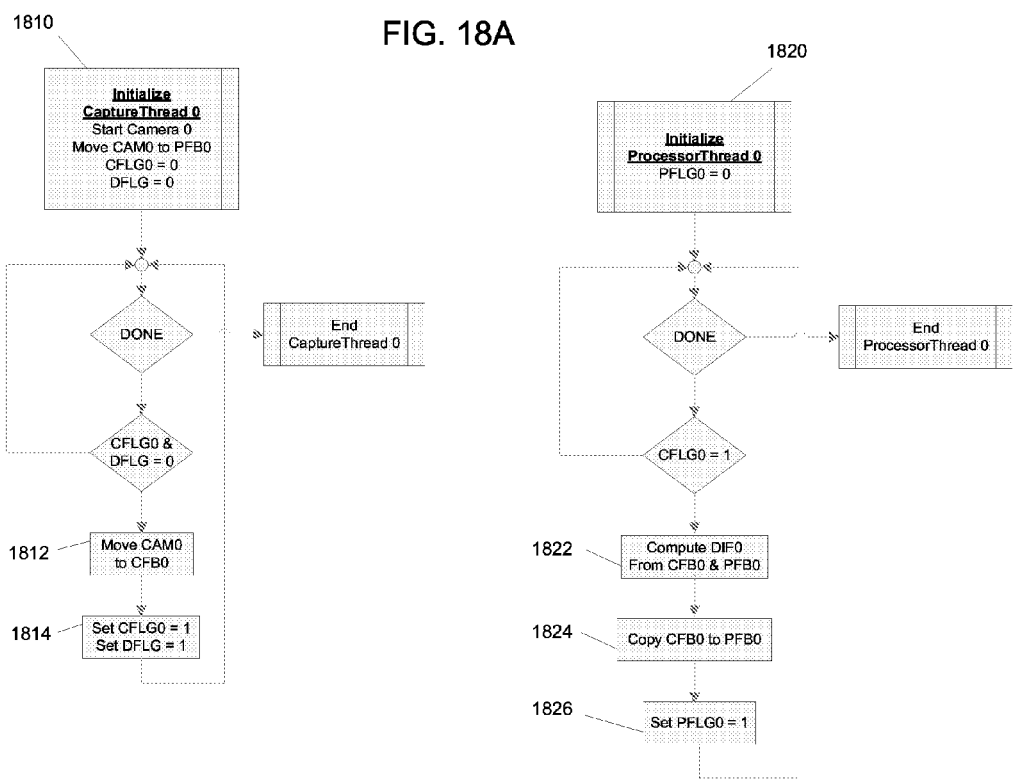
FIG. 18A comprises an example of two threaded processes executed by the lighting apparatus to asynchronously capture video frames on one thread and to asynchronously perform image processing for a movement in the scene of the captured image on the other thread in accordance with various embodiments of the invention.
Figure 18B:
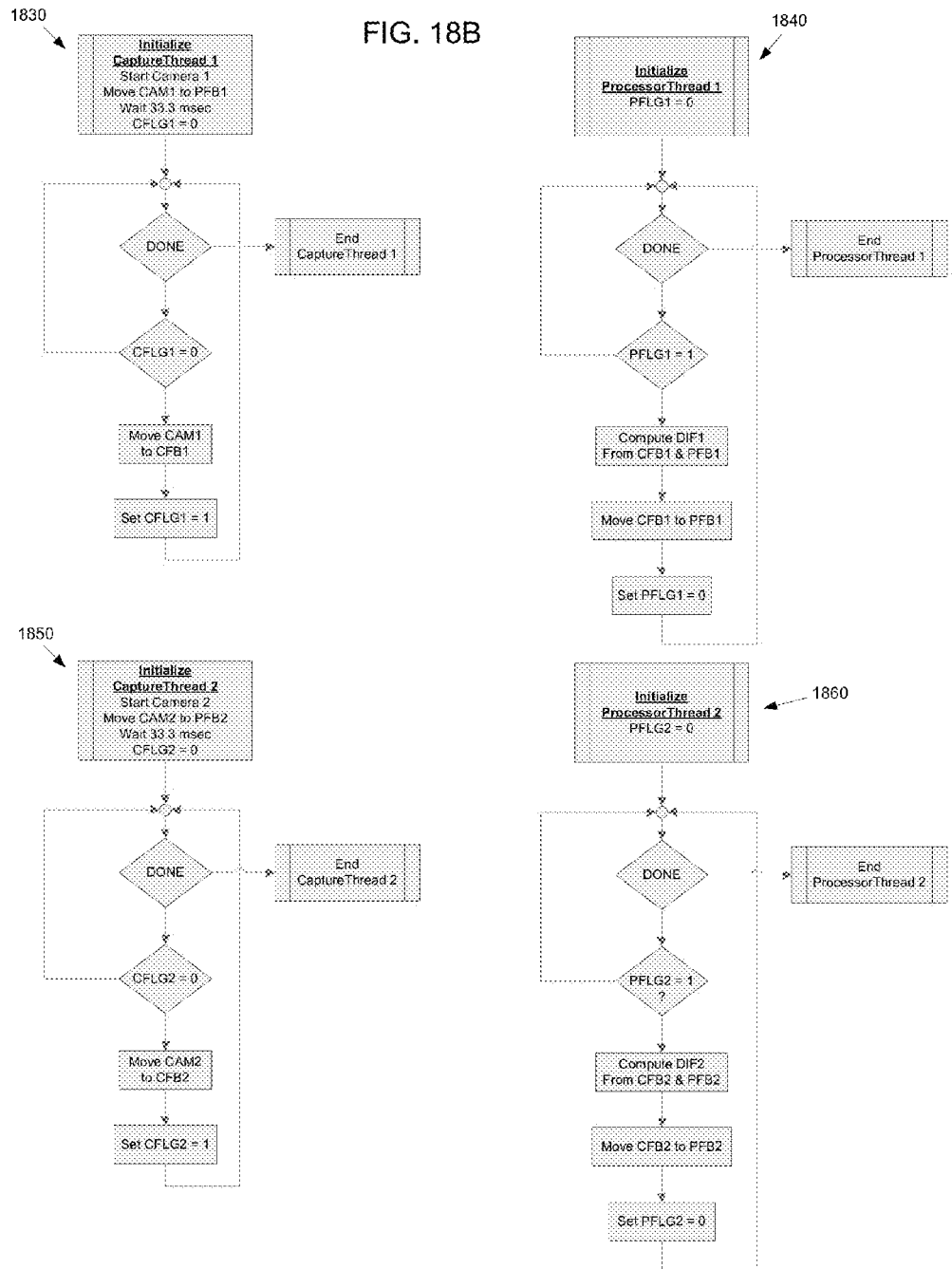
FIG. 18B comprises an example of four additional threaded processes, similar to those of FIG. 18A, executed by the lighting apparatus to asynchronously capture video frames from two additional cameras on two additional threads and to asynchronously perform image processing for a movement in the scene of the captured images on the other two additional threads in accordance with various embodiments of the invention.
Figure 18C:
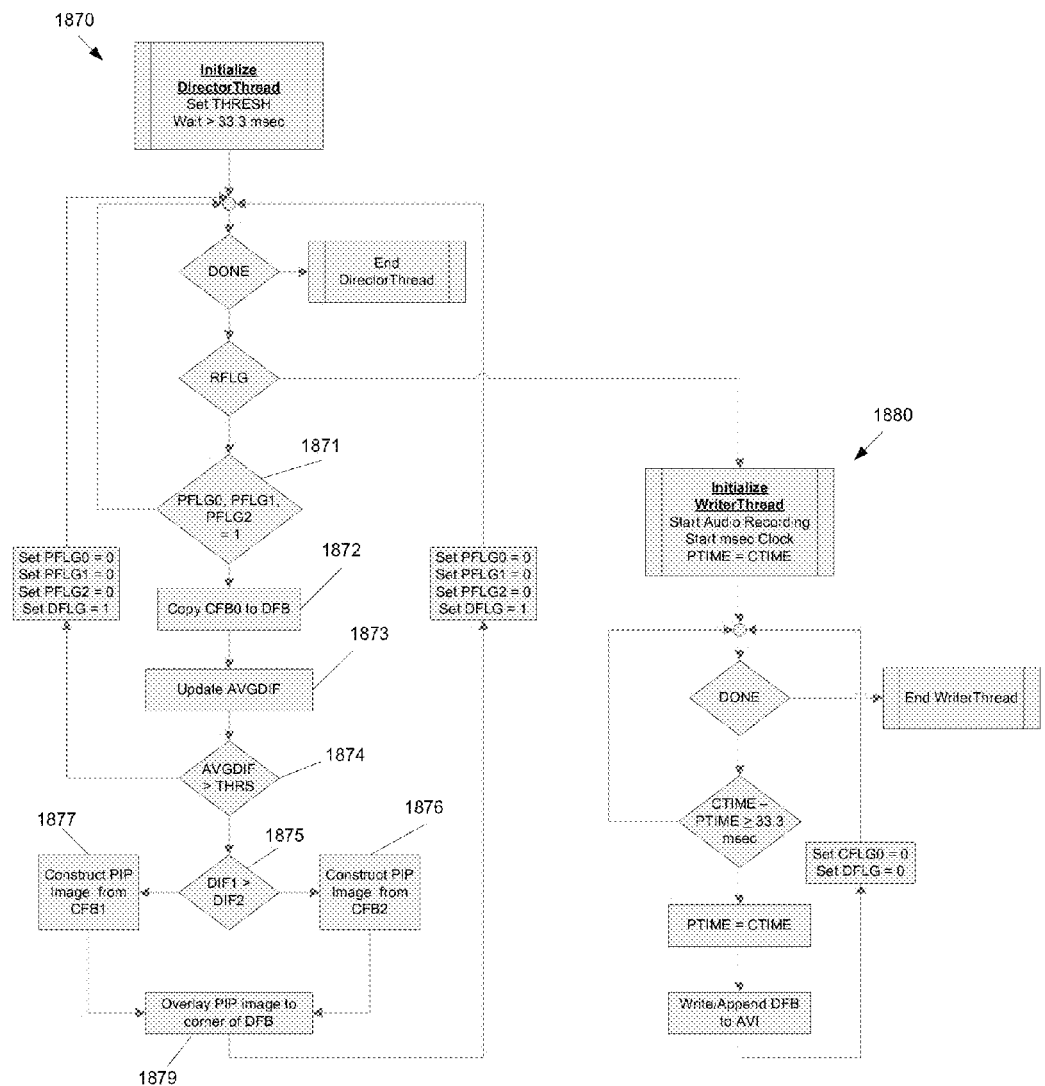
FIG. 18C comprises an example of two threaded processes executed by the lighting apparatus to asynchronously select individual frames of video from three cameras on one thread, to create a composite single output video stream for display, and to record the created output video with corresponding audio on the other thread in accordance with various embodiments of the invention.

Turning now to FIGS. 18A, 18B, and 18C, eight flow diagrams are shown 1810, 1820, 1830, 1840, 1850, 1860, 1870, and 1880 wherein each flow diagram represents a separate software thread. A main parent software process runs from the processing device 745, which launches all of these threads asynchronously. However, they may share images and data through the use of shared memory resources allocated in the parent process. These shared resources are named and listed in TABLE 6 to enable clarity of presentation and understanding of the action of the different threads.

There are three image frame capture threads 1810, 1830, and 1850 receiving frame by frame image input from the three camera video streams. For example, in 1810 Capture-Thread 0 receives video input from the middle camera 730 in FIG. 7. Each successive frame of video is available in that camera's internal hardware image buffer for 33.3 msec (at 30 frames/sec). At step 1812, the thread moves the image frame from CAM0 internally into the processing device's 745 process allocated memory CFB0 for that video stream. At step 1814, the thread sets its Frame Capture Flag CFLG0 to 1, which then allows the companion ProcessThread 0 to compute a difference metric DIF0 between the current frame and the previous frame PFB0 at 1822. ProcessThread 0 then continues to copy the current image in CFB0 to replace the image in the previous frame buffer PFB0 at step 1824 and then sets its PFLG0 to 1, thus allowing the asynchronously running DirectorThread to use the DIF0 value in FIG. 18C to update the AVGDIF. At the same time ImageCapture threads 1 and 2 1830 and 1850 are operating similarly to acquire image frames from their respective video cameras 750 in FIG. 7, and ProcessorThreads 1 and 2 1840 and 1860 are operating to compute the difference metrics DIF1 and DIF2 respectively between their current and previous image frames. Thus, in this example, six threads, operating on six separate logical CPUs are operating in this manner to achieve image frame input from the three video streams.

At the same time that the capture threads are running to acquire images, two other threads, the DirectorThread 1870 and the WriterThread 1880, are running to construct a composite video stream, combining the three separate video streams into one final composite stream. This composite video is displayed by the DirectorThread, and the DirectorThread 1870 determines which frames of video will be used to construct the composite video from the three inputs. If the record flag RFLG is set the composite video is also stored at 30 frames/sec, and an audio file is also recorded that is combined with the composite video stream at the end of the process. In this example the SoX Sound Exchange program running on the Ubuntu operating system is used to merge the recorded .wav files with the recorded .avi files created by the WriterThread.

The primary input, collected on a frame by frame basis, for the reconstructed composite video comes from camera 0, which is the middle camera 730 in FIG. 7, and which provides an overview of the table surface. One of the purposes of the composite video is to obtain an accurate record of ball positioning prior to each shot and during the movement of the balls afterwards. However, there are periods after the balls stop moving where other interesting and informational aspects of the play are occurring. The reconstructed composite video captures both of these activities through the utilization of the 3 cameras and reconstructing one composite video record. As long as motion is occurring, in the middle camera 730 view, the other two end table video streams from cameras 750 are not included in the reconstruction. The determination of motion in this example is determined by monitoring the difference DIF0 between successive frames from camera 0, and computed at 1822 in ProcessThread 0 1820. The Director thread computes AVGDIF, a running average of the last 30 sequential DIF0 values, and compares this value to a fixed threshold THRS to decide if motion is occurring.

Other methods of determining the start of motion, such as using the striking sound of the cue stick hitting the cue ball (as described in U.S. provisional patent application 62/032, 187 and included herein by reference), or by specifically tracking object ball motion, as is well known is the art, could also be utilized to determine or define which frames from the multiple cameras to include in a composite video.

Returning again to the DirectorThread 1870, if all of PFLG0, PFLG and PFLG2 are equal to 1 at 1871, signifying that new image frames are in the current frame buffers CFB0, CFB1 and CFB2, then the thread proceeds to Copy CFB0 to DFB at 1872. DFB is the memory buffer that displays the current image frame, and it will either be the current CFB0 video frame without modification, or will later in the thread be overlaid in the corner with a PIP image. At 1873 the AVGDIF value is updated by averaging the current DIF0 into the running average, and then at 1874 the updated AVGDIF is compared to THRS to decide if motion is present in the middle camera table view. FIGS. 13A and 13B illustrate the type of frames that are included in the case of detected motion. These figures are from a sequence of a video frames showing the darker "4 ball" being hit by the white cue ball, propelling the "4" ball towards the side pocket. Because the ball motion from these and prior sequential frames results in an AVGDIF value above the threshold THRS, these frames would simply be added to the reconstructed composite video stream to the exclusion of the end camera views.

Figure 17A:
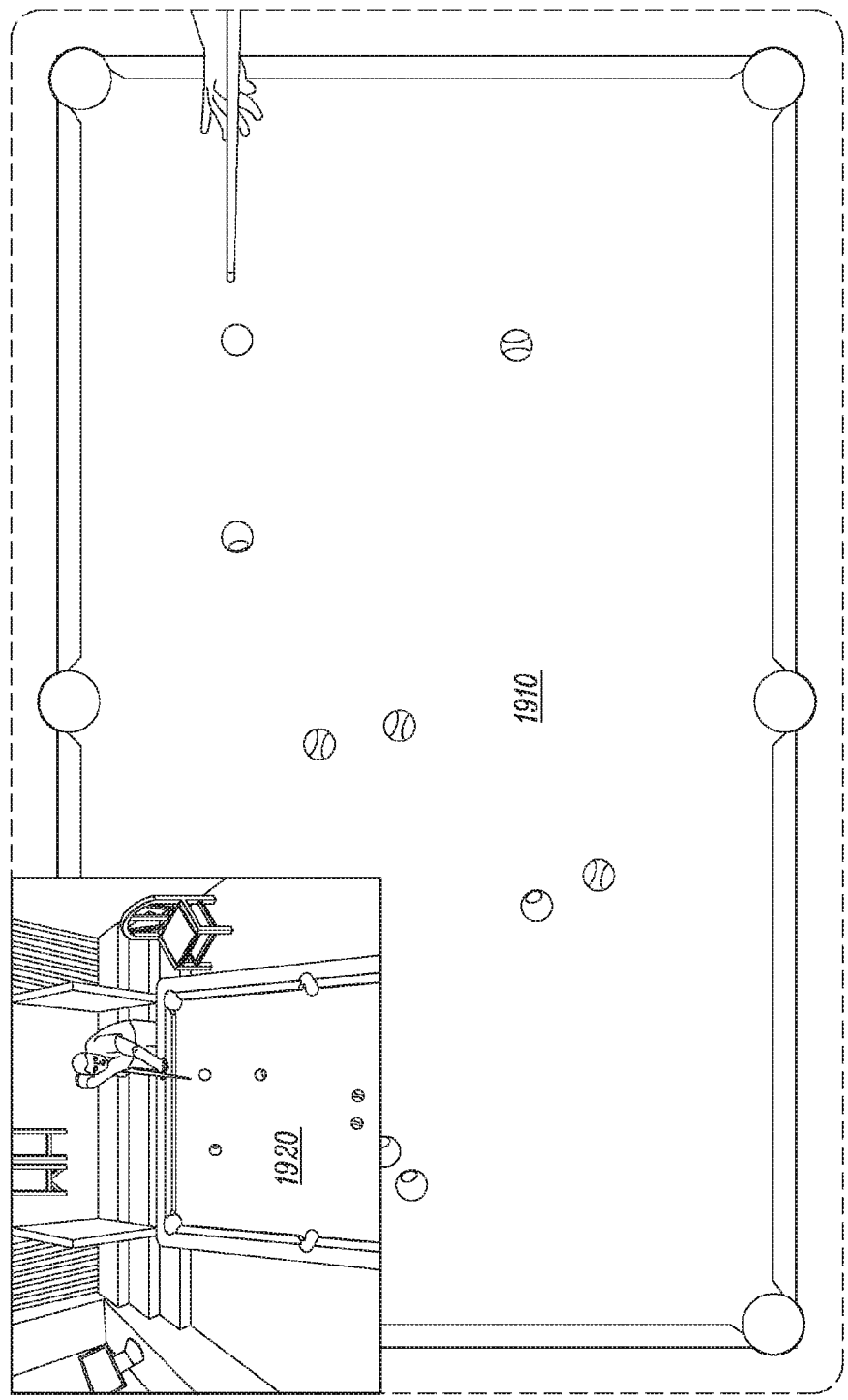
FIG. 17A comprises an example composite image video frame constructed in real time from the camera mounted above the middle portion of the billiard table and the camera mounted at the head end of the billiard table in accordance with various embodiments of the invention.
Figure 17B:
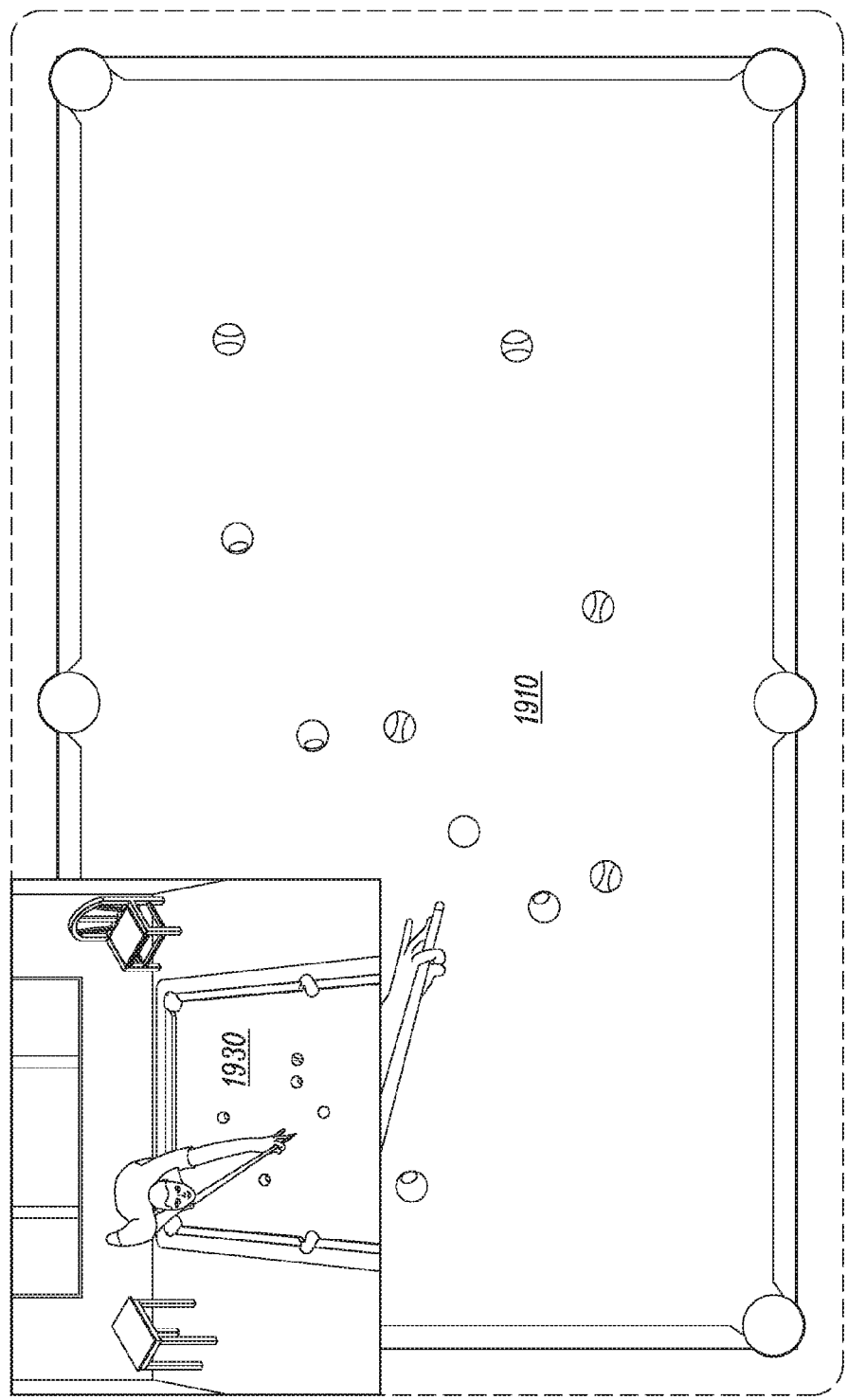
FIG. 17B comprises an example composite image video frame, similar to FIG. 17A, constructed in real time from the camera mounted above the middle portion of the billiard table and the camera mounted at the foot end of the billiard table in accordance with various embodiments of the invention.

If motion is not present at 1874 then the thread compares DIF1 and DIF2 at 1875 to see which end view has the most motion going on. The video stream having the most motion as reflected by the higher difference value DIF1 or DIF2 will be chosen to provide the end view frame to be reduced in size by ¼ at step 1876 or 1877 and overlaid in a corner of DFB at step 1879 to create a picture-in-picture reconstructed image frame. If the difference value DIF1 for video stream 1 is greater that the difference value DIF2 for video stream 2, the PIP frame is constructed 1870 from video frames from video streams 0 and 1. If the difference value DIF2 for video stream 2 is greater that the difference value DIF1 for video stream 1, the PIP frame is constructed 1876 from video frames from video streams 0 and 2. The resulting video frames correspond to those illustrated in FIGS. 17A and 17B where the end view frame chosen is the one with the most motion. Thus, the operation of the DirectorThread is to determine if there is motion and choose the appropriate next sequential image frame for the displayed video. If there is no motion on the table, then the reconstructed video should show the activity around the periphery of the table, which is usually the player getting ready for the next shot. The PIP frame shows this, but still in the context of the overview of the balls on the table surface prior to motion stoppage.

Turning now to step 1880 in FIG. 18C, the WriterThread controls the synchronization of the process of recording the composite video record. The WriterThread is activated optionally by the operator of the apparatus and in that case the WriterThread is created and started by the DirectorThread. It also starts the audio recording during its initialization and starts a msec clock to measure the recorded frame time interval precisely. Because the audio signal is being recorded in real time, a composite video stream must be generated that corresponds exactly to the audio record with regard to its visual content. Thus, the three separate video camera streams can be started and operated asynchronously in CaptureThreads 0, 1 and 2, and their captured images can be subjected asynchronously to image processing in ProcessorThreads 0, 1, and 2 to compute a motion analysis metric. And then, the DirectorThread may further select asynchronously and if necessary add PIP frames for inclusion. However, the WriterThread without time variance must record the contents of the display buffer DFM at exactly $\frac{1}{30}^{th}$ of a second to acquire and construct the composite video. Whatever happens to be in the DFM display at that precise time is written to the recorded video output file.

The control described above regarding the provided images can be effected in a number of alternative ways. During a time with no ball motion, the determination of which end camera view to display can be made using information from motion sensors disposed on the frame to detect motion in areas around the table corresponding to the respective fields of view of the respective end cameras. In another approach, one or more the processing devices can perform image analysis on the video feeds provided by the respective cameras to determine which camera is capturing the most motion. The determination of when to remove the overlaid video feed from an end camera can be made by detecting the sound of the cue striking a ball, image analysis of the video feed from the center camera, or a combination of both. For instance, sometimes the center camera may capture motion other than that of the balls on the table such as movement of a cue which can be confused with motion of the balls. Combining image analysis of the balls with sound detection of the striking cue allows the removal of the overlaid video frame in response to sound detection of the striking cue and maintaining removal of the overlaid video frame while detecting ball motion. The processing required to effect these actions can done on any combination of processing devices.

Figure 19:
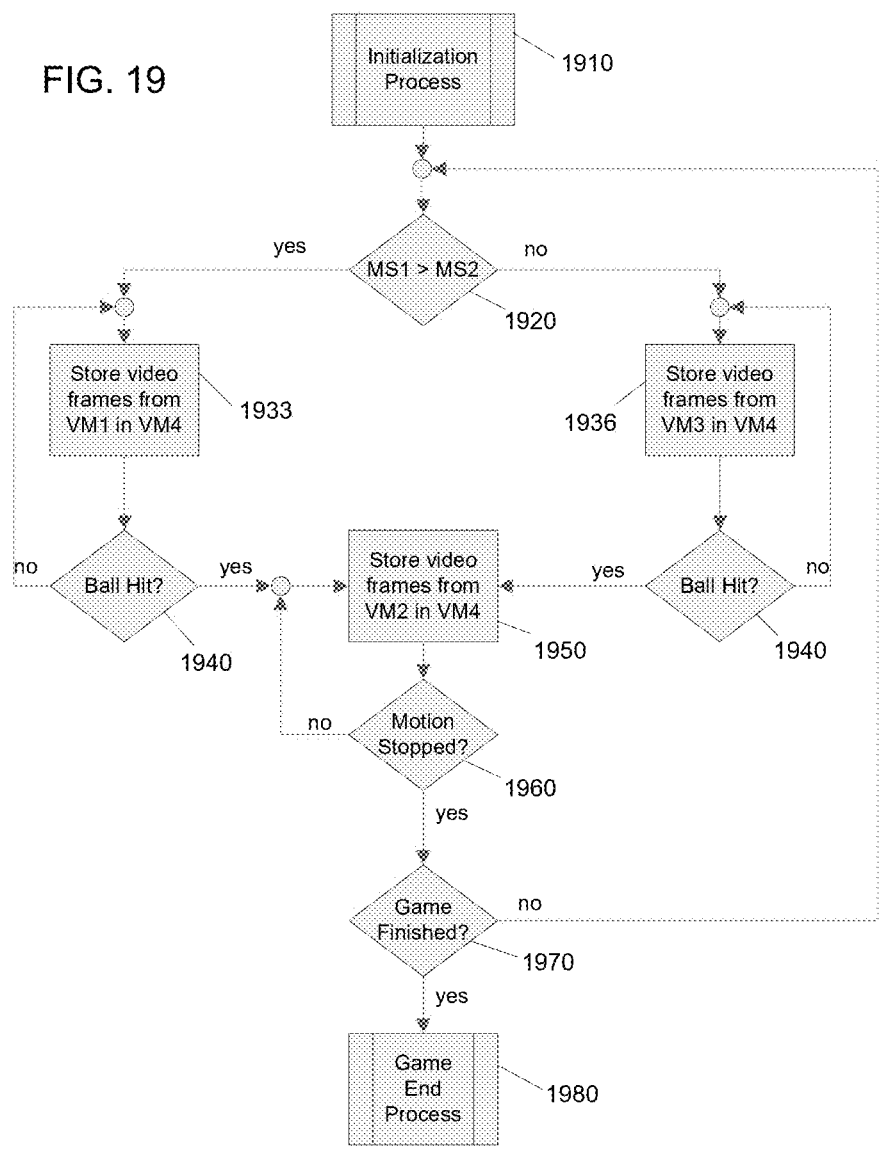
FIG. 19 comprises a flow chart of an example method of execution for a lighting apparatus for merging video streams from multiple sources in accordance with various embodiments of the invention.

Referring to FIG. 19, another example process executed by the lighting apparatus to automatically provide image storage and/or display from different cameras based on game play conditions will be described. In this example, the processing device is in communication with a middle camera 730 in FIG. 7, to capture images of the table surface into video memory VM2, and cameras 750 at both ends of the frame to respectively capture images from opposite ends of the billiard table and first and second areas surrounding the respective ends of the table into video memories VM1 or VM3 respectively, and motion sensors 760 in FIG. 7 (labeled MS1 and MS2 in FIG. 19) disposed to detect motion in the areas surrounding the opposing ends of the table, and a microphone. The cameras and motion detectors could be mounted over and/or capturing images of or sensing motion around sides of the table in addition to or in lieu of the cameras over the ends of the table.

First, the processing device wakes or resets with an initialization process 1910. Then, assuming that there is no motion of the balls on the table, the processing device monitors for motion from the first area and the second area surrounding the billiard table surface through the use of one or more motion detectors or real time image analysis techniques described above. Then, the processing device determines at step 1920 with respect to detected motion from which camera images should be stored or displayed in video memory VM4 (the output or display/recorded video memory). More specifically, in response to detecting motion from the first area (or in the case of motion in both areas, where the motion signal is higher in the first area), the processing device effects stopping storing or providing images from the second side/end camera into VM4, and effects storing or providing images 1933 from the first side/end camera to store or provide images from the first area into VM4. For example, this includes storing or providing video or a video file that can be played on a display. In response to detecting motion from the second area (or in the case of motion in both areas, where the motion signal is higher in the second area), the processing device effects stopping storing or providing images from the first side/end camera into VM4, and effects storing or providing images 1936 from the second side/end camera to store or provide images from the second area. Under either case (same procedure for both steps labeled 1940), the processing device next monitors for a ball hit; by detecting motion, for example, by real time image analysis, and/or by the striking of a ball, for example, by detecting a strike sound having characteristics of a cue striking a billiard ball. In response to detecting a ball hit, the processing device effects stopping storing or providing images from the respective side/end camera into VM4 and effects storing or providing images VM2 into VM4 at step 1950 from the middle camera' memory VM2 so that images of the field of view capturing the table and the balls' motion are captured.

The processing device then monitors 1960 for stoppage of the balls' motion, such as through use of one or more motion detectors or real time image analysis techniques described above. In response to detecting stoppage of motion of balls on the billiard table surface, the processing device effects stopping storing or providing images from the middle camera and effects storing or providing images from the one of the side/end cameras as discussed above. The processing device may determine 1970 that the game is finished either by tracking which balls are on the table with respect to the game being played or by receiving a user initiated signal that indicates completion of play. In response to determining that the game is finished, the image capture and other game process is ended 1980.

In an additional alternative embodiment, the functionality or logic described in FIGS. 18A, 18B, 18C, and 19 may be embodied in the form of code that may be executed in a separate processor circuit. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s). Accordingly, a computer readable medium (being non-transitory or tangible) may store such instructions that are configured to cause a processing device to perform operations as described herein.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A lighting apparatus for lighting a billiard table surface, the apparatus comprising:
   a frame configured to support one or more lights above the billiard table surface;
   the one or more lights comprising a light source or sources mounted in the frame in a configuration to provide substantially uniform illumination of the billiard table surface;
   a middle frame portion spanning across a middle portion of the frame corresponding to a middle portion of the billiard table surface when mounted above the billiard table surface, the middle portion of the frame configured to support a middle camera directed to record images of the billiard table surface;
   an end portion of the frame corresponding to a head or foot end portion of the billiard table surface when mounted above the billiard table surface, the end portion of the frame configured to support an end camera directed to record images of at least a portion of the billiard table surface and an area surrounding a head or foot end portion of the billiard table surface;
   a processing device in operative communication to receive the images recorded by the middle camera, wherein the processing device is configured to:
   determine whether balls on the billiard table surface are in motion or non-motion based on the images recorded by the middle camera, and
   in response to determining non-motion of balls on the billiard table surface, both:
   stop recording or stop provision of images from the middle camera, and
   effect a combination of storing or providing images from the end camera together with an image from the middle camera to provide a picture in picture image.

2. The lighting apparatus of claim 1 wherein the one or more lights are non-centrally placed such that no light sources are placed approximately directly above a middle portion of the billiard table surface.

3. The lighting apparatus of claim 1 wherein individual ones of the light source or sources comprise a set of LED lights mounted in a linear configuration.

4. The lighting apparatus of claim 1 wherein the light source or sources comprise light sources mounted in the frame in a configuration around a periphery of the billiard table surface.

5. The lighting apparatus of claim 1 wherein the frame is configured to mount the one or more lights within a given horizontal distance from edges of the billiard table.

6. The lighting apparatus of claim 1 wherein the frame is configured to mount pairs of the one or more lights in a generally perpendicular configuration above each corner of the billiard table surface.

7. The lighting apparatus of claim 1 wherein the frame is configured to mount two of the one or more lights generally equally spaced along each long side of billiard table surface.

8. The lighting apparatus of claim 1 further comprising:
a processing device in operative communication to receive the images recorded by the middle camera, wherein the processing device is configured to:
automatically control a setting for the lighting apparatus based at least in part on the balls being either in motion or non-motion.

9. The lighting apparatus of claim 1 further comprising an end portion of the frame corresponding to a head or foot end portion of the billiard table surface when mounted above the billiard table surface, the end portion of the frame configured to support an end camera directed to record images of at least a portion of the billiard table surface and an area surrounding a head or foot end portion of the billiard table surface opposite that over which the end camera is mounted.

10. The lighting apparatus of claim 1 further comprising:
a processing device; and
a motion sensor supported by the frame,
wherein the processing device is in operative communication with the motion sensor to automatically control a setting for the lighting apparatus in response to detection of motion.

11. The lighting apparatus of claim 10 wherein the processing device is configured to power off the plurality of lights automatically in response to the motion sensor's failing to detect motion for a threshold time period.

12. The lighting apparatus of claim 1 wherein the processing device is configured to monitor sound captured by a microphone to detect a strike sound having characteristics of a cue striking a billiard ball, and in response to detecting the strike sound, to automatically control a setting for the lighting apparatus.

13. The lighting apparatus of claim 12 wherein the processing device is configured to in response to detecting the strike sound, start recording or provision of images from the middle camera mounted on the middle frame portion of the frame.

14. The lighting apparatus of claim 1 wherein the processing device is configured to communicate with a user communication device to provide images from one or more cameras disposed to capture images of the billiard table surface and/or areas surrounding the billiard table surface.

15. The lighting apparatus of claim 14 wherein the processing device is configured to communicate with at least two cameras of the one or more cameras to coordinate storage of the images or provision of the images to the user communication device.

16. The lighting apparatus of claim 15 wherein the processing device is configured to provide images from a first camera in response to detecting motion from a first motion sensor and to provide images from a second camera in response to detecting motion from a second motion sensor.

17. The lighting apparatus of claim 16 wherein the processing device is configured to store or provide images from the middle camera in response to detecting the strike sound and to store or provide images from the first camera or the second camera in response to detecting non-motion of balls on the billiard table surface.

18. The lighting apparatus of claim 1 wherein the frame supports one or more diffuser elements disposed to diffuse light rays from the light source or sources.

19. The lighting apparatus of claim 18 wherein the one or more diffuser elements comprise a bottom diffuser disposed between the light source or sources and the billiard table surface.

20. The lighting apparatus of claim 19 wherein the one or more diffuser elements comprise a first mirrored diffuser disposed between the light source or sources and an outer wall of the frame that faces away from a center of the billiard table surface.

21. The lighting apparatus of claim 20 wherein the first mirrored diffuser is oriented essentially perpendicular with the billiard table surface so that a mirrored surface of the first mirrored diffuser reflects light from the light source or sources toward the center of the billiard table surface.

22. The lighting apparatus of claim 20 wherein the one or more diffuser elements comprise a second mirrored diffuser between the light source or sources and an inner wall of the frame that faces toward the center of the billiard table surface.

23. The lighting apparatus of claim 22 wherein the second mirrored diffuser is disposed at an angle so that its mirrored surface reflects light generally toward both the bottom diffuser and the first mirrored diffuser to effect direction of more light at the billiard table surface.

24. A method of lighting a billiard table surface, the method comprising:
lighting the billiard table surface with a substantially uniform illumination from a light source or sources mounted in a frame above the billiard table surface;
capturing images of an entirety of the billiard table surface from a middle camera;
capturing images with a side/end camera of at least a portion of the billiard table surface and an area surrounding a portion of the billiard table surface;
storing or providing images from the middle camera in response to detecting motion of balls on the billiard table surface;
detecting stoppage of motion of balls on the billiard table surface by determining whether balls on the billiard table surface are in motion or non-motion based on the images captured by the middle camera, and automatically controlling a setting based at least in part on the balls being either in motion or non-motion;
in response to the detecting stoppage of motion of balls on the billiard table surface, both:
stopping storing or stopping providing images from the middle camera, and
effecting a combination of storing or providing images from the side/end camera together with an image from the middle camera to provide a picture in picture image.

25. The method of claim 24 wherein the lighting comprises providing lighting from one or more lights that are non-centrally placed such that no light sources are placed approximately directly above a middle portion of the billiard table surface.

26. The method of claim 24 wherein the lighting comprises providing the lighting from one or more sets of LED lights mounted in a linear configuration.

27. The method of claim 24 wherein the lighting comprises providing the lighting from light sources mounted in the frame in a configuration around a periphery of the billiard table surface.

28. The method of claim 24 wherein the lighting comprises providing the lighting from lights within a given horizontal distance from edges of the billiard table.

29. The method of claim 24 wherein the lighting comprises diffusing the light from the light source or sources with one or more diffuser elements.

30. The method of claim 29 wherein the diffusing the light comprises diffusing the light with a bottom diffuser disposed between the light source or sources and the billiard table surface.

31. The method of claim 29 wherein the diffusing the light comprises diffusing the light with a first mirrored diffuser disposed between the light source or sources and an outer wall of the frame that faces away from a center of the billiard table surface.

32. The method of claim 31 wherein the first mirrored diffuser is oriented essentially perpendicular with the billiard table surface so that the method further comprises a mirrored surface of the first mirrored diffuser reflecting light from the light source or sources toward the center of the billiard table surface.

33. The method of claim 29 wherein the diffusing the light comprises diffusing the light with a second mirrored diffuser between the light source or sources and an inner wall of the frame that faces toward the center of the billiard table surface.

34. The method of claim 33 wherein the second mirrored diffuser is disposed at an angle so that the method further comprising a mirrored surface of the second mirrored diffuser reflecting light generally toward both the bottom diffuser and the first mirrored diffuser to effect direction of more light at the billiard table surface.

35. The method of claim 24 further comprising:
 detecting a strike sound having characteristics of a cue striking a billiard ball; and
 in response to detecting the strike sound:
 stopping storing or providing images from the side/end camera, and
 storing or providing images from the middle camera.

36. The method of claim 32 wherein the capturing images with the side/end camera further comprises:
 capturing images with a first side/end camera of a first portion of the billiard table surface and a first area surrounding a portion of the billiard table surface,
 capturing images with a second side/end camera of a second portion of the billiard table surface and a second area surrounding a portion of the billiard table surface different from the first area,
 wherein the first area and the second area are at least partially different;
 and wherein the method further comprises:
 monitoring for motion from the first area and the second area surrounding the billiard table surface;
 during the detecting of stoppage of motion of balls on the billiard table surface:
 in response to detecting motion from the first area: stopping storing or providing images from the second side/end camera, and storing or providing images from the first side/end camera; and
 in response to detecting motion from the second area: stopping storing or providing images from the first side/end camera, and storing or providing images from the second side/end camera.

37. A lighting apparatus for lighting a billiard table surface, the apparatus comprising:
 a troffer frame configured to support one or more lights above the billiard table surface;
 the troffer frame configured to support the one or more lights around a periphery of the billiard table surface such that no light sources are placed approximately directly above a middle portion of the billiard table surface;
 a middle frame portion spanning across a middle portion of the troffer frame corresponding to a middle portion of the billiard table surface when mounted above the billiard table surface, the middle portion of the frame configured to support a middle camera directed to record images of the billiard table surface;
 an end portion of the troffer frame corresponding to a head or foot end portion of the billiard table surface when mounted above the billiard table surface, the end portion of the troffer frame configured to support an end camera directed to record images of at least a portion of the billiard table surface and an area surrounding a head or foot end portion of the billiard table surface;
 a processing device in operative communication to receive the images recorded by the middle camera, wherein the processing device is configured to:
 determine whether balls on the billiard table surface are in motion or non-motion based on the images recorded by the middle camera, and
 in response to determining non-motion of balls on the billiard table surface, both:,
 stop recording or stop provision of images from the middle camera, and
 effect a combination of storing or providing images from the end camera together with an image from the middle camera to provide a picture in picture image.

38. The lighting apparatus of claim 37 wherein the troffer frame is substantially hollow in its inner structure, wherein the inner structure is configured to support the one or more lights by a top portion of the inner structure opposing a portion of the troffer frame closest to the billiard table surface when installed, wherein opposing sides of the troffer frame extend down from the top portion encasing the one or more lights and support reflective surfaces.

39. The lighting apparatus of claim 38 wherein the troffer frame supports a bottom diffuser between the one or more lights and the billiard table surface, and wherein the opposing sides of the troffer frame support mirrored diffusers as the reflective surfaces on opposing sides of the one or more lights.

40. The lighting apparatus of claim 37 wherein when the one or more lights are lit and the troffer frame is installed above the billiard table surface, the lighting apparatus provides substantially uniform illumination of the billiard table surface.

41. The lighting apparatus of claim 40 wherein the substantially uniform illumination of the billiard table surface comprises illumination of between 50 and 115 foot-candles.

42. The lighting apparatus of claim 37 wherein individual ones of the one or more lights comprise an LED light element.

* * * * *